United States Patent
Suemasu

(10) Patent No.: US 7,582,336 B2
(45) Date of Patent: Sep. 1, 2009

(54) METHOD OF PRODUCING OPTICAL ELEMENT AND APPARATUS FOR PRODUCING OPTICAL ELEMENT

(75) Inventor: Atsushi Suemasu, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 473 days.

(21) Appl. No.: 11/409,322

(22) Filed: Apr. 24, 2006

(65) Prior Publication Data

US 2006/0255317 A1    Nov. 16, 2006

(30) Foreign Application Priority Data

Apr. 28, 2005   (JP)  ............... 2005-133616
Aug. 11, 2005   (JP)  ............... 2005/232883

(51) Int. Cl.
    *C09K 19/00*    (2006.01)
    *C09K 19/06*    (2006.01)
    *C09K 19/38*    (2006.01)
    *C09K 19/52*    (2006.01)

(52) U.S. Cl. ................... 428/1.1; 428/1.2; 428/1.3; 430/20; 252/299.01

(58) Field of Classification Search .......... 428/1.1, 428/1.2, 1.3; 430/20; 252/299.01

See application file for complete search history.

(56) References Cited

U.S. PATENT DOCUMENTS

2007/0087135 A1*   4/2007   Hayashi ................ 428/1.3

2007/0097313 A1*   5/2007   Hayashi et al. ........... 349/168

FOREIGN PATENT DOCUMENTS

| JP | A-05-142531 | 6/1993 |
| JP | A-2002-174724 | 6/2002 |
| JP | A-2002-174725 | 6/2002 |
| JP | A-2003-121852 | 4/2003 |

* cited by examiner

*Primary Examiner*—Geraldina Visconti
(74) *Attorney, Agent, or Firm*—Oliff & Berridge, PLC

(57) ABSTRACT

The present invention provides a method of producing an optical element the haze of which is efficiently reduced and an apparatus for producing the optical element. An optical element which includes a base material having light transmittance and a functional layer containing a functional substance and laminated on the surface of the base material, in which the state of light passing through the functional layer is changed in accordance with the functional substance, and the haze of which is efficiently reduced is provided by means of a method of producing the optical element including: a coating step of coating the surface of the base material with a functional layer composition liquid containing the functional substance to form a coating film; a baking step of baking the base material having the coating film formed on its surface to form the functional layer in which a functional layer-covering layer is formed to cover the functional layer and a light diffusion layer for diffusing light that has passed through the functional layer is formed in a direction from the surface layer of the functional layer-covering layer toward an interface between the functional layer-covering layer and the functional layer; and a covering layer removing step of removing at least the light diffusion layer out of the functional layer-covering layer to be formed in the baking step.

32 Claims, 7 Drawing Sheets

[FIG. 1]
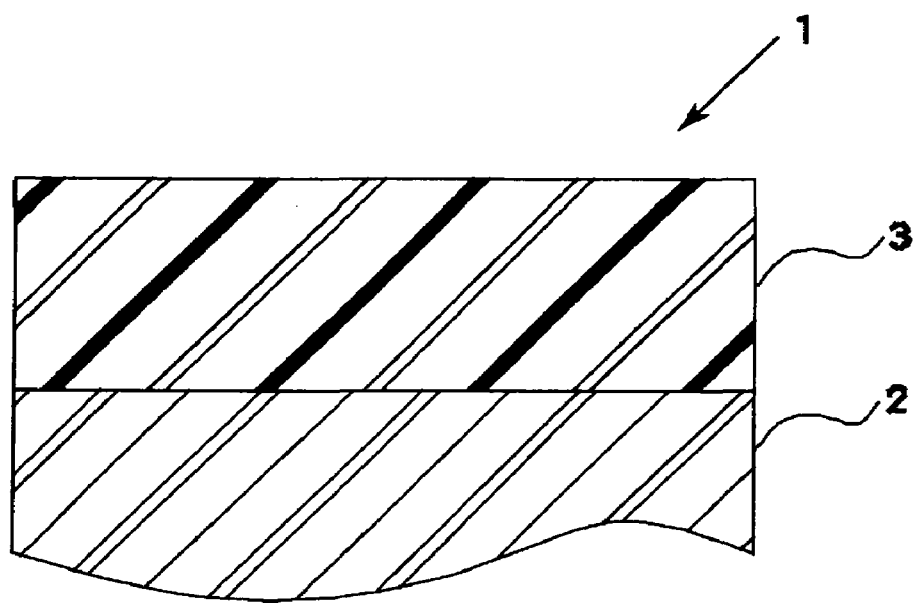

[FIG. 2A]
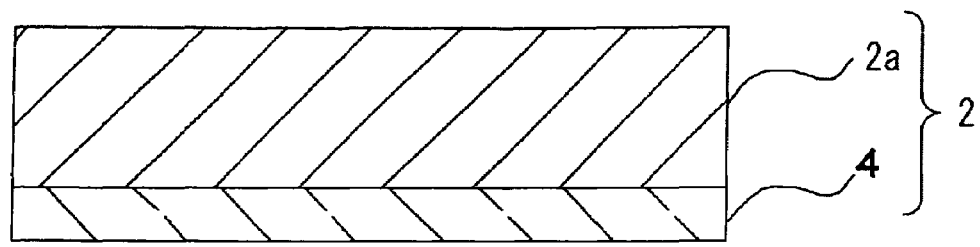
[FIG. 2B]
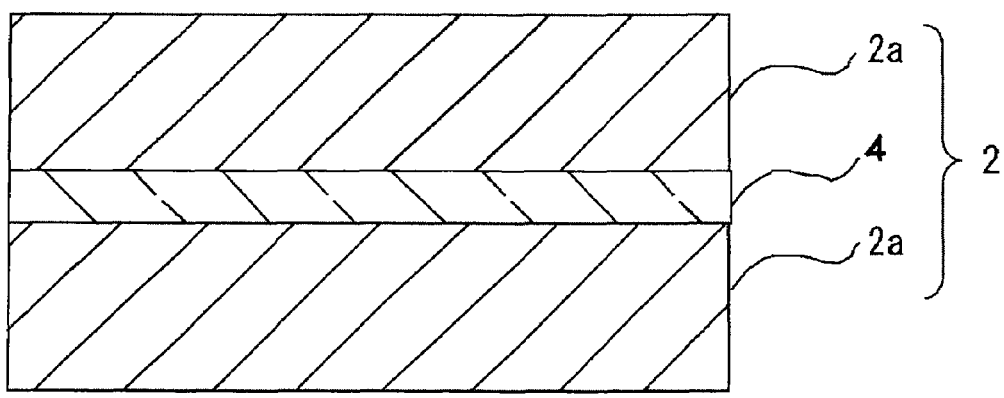

[FIG. 3]
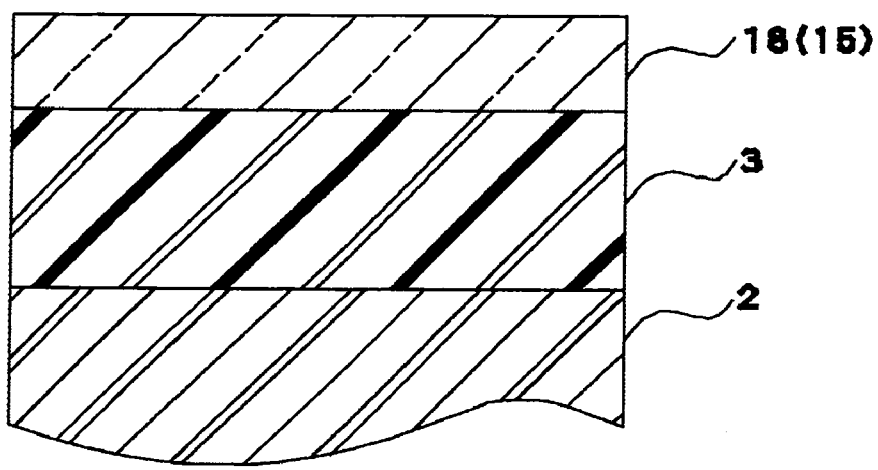

[FIG. 4]
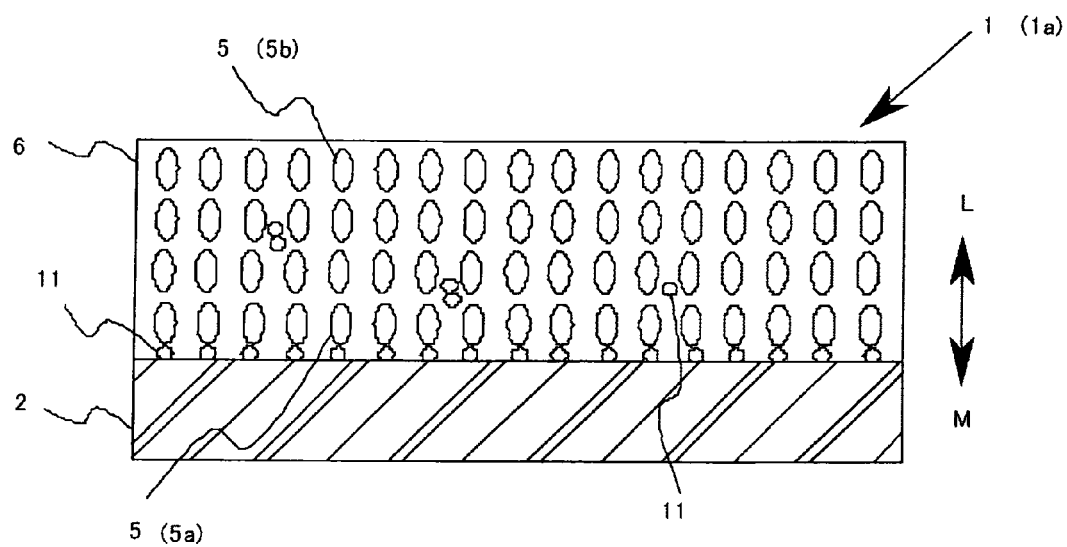

[FIG. 5A]
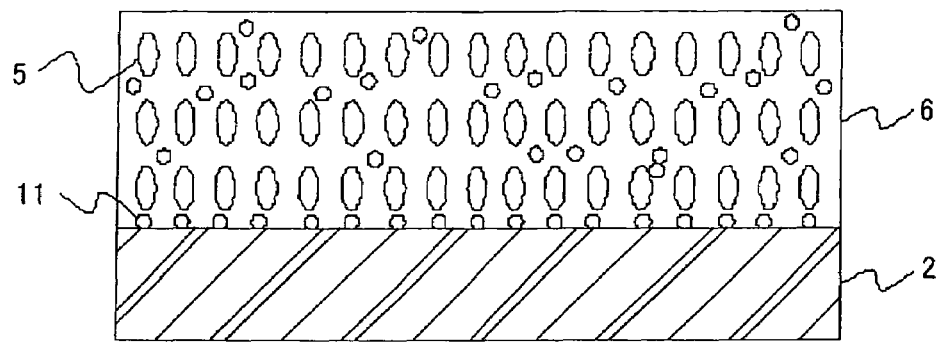
[FIG. 5B]
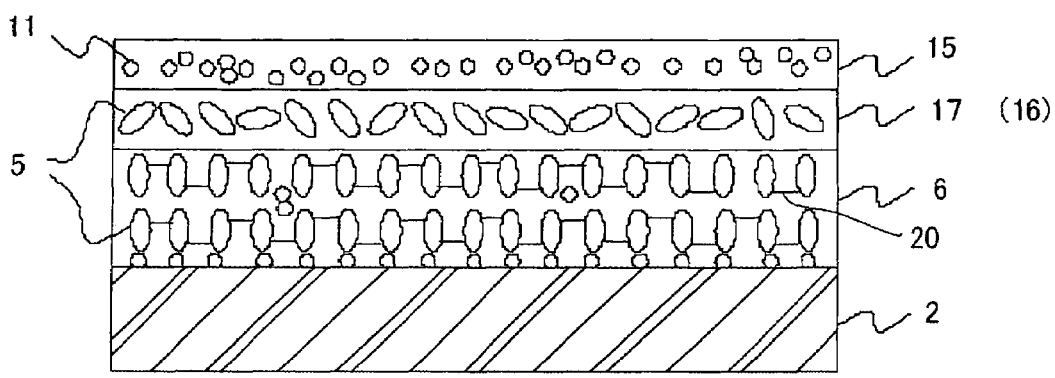
[FIG. 5C]
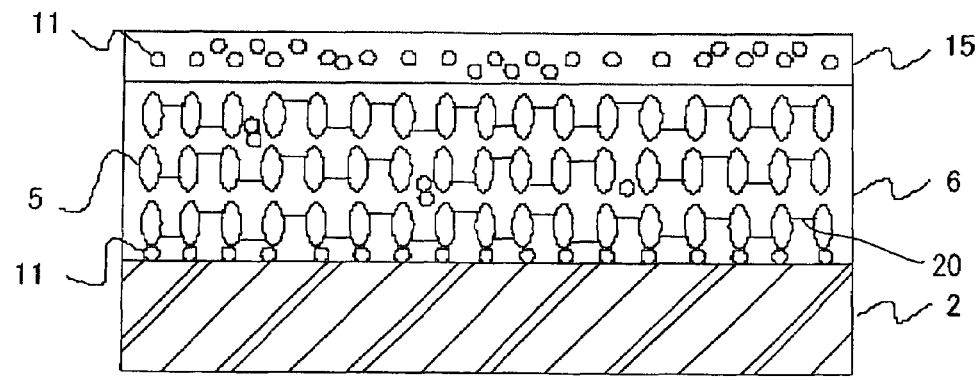

[FIG. 6]
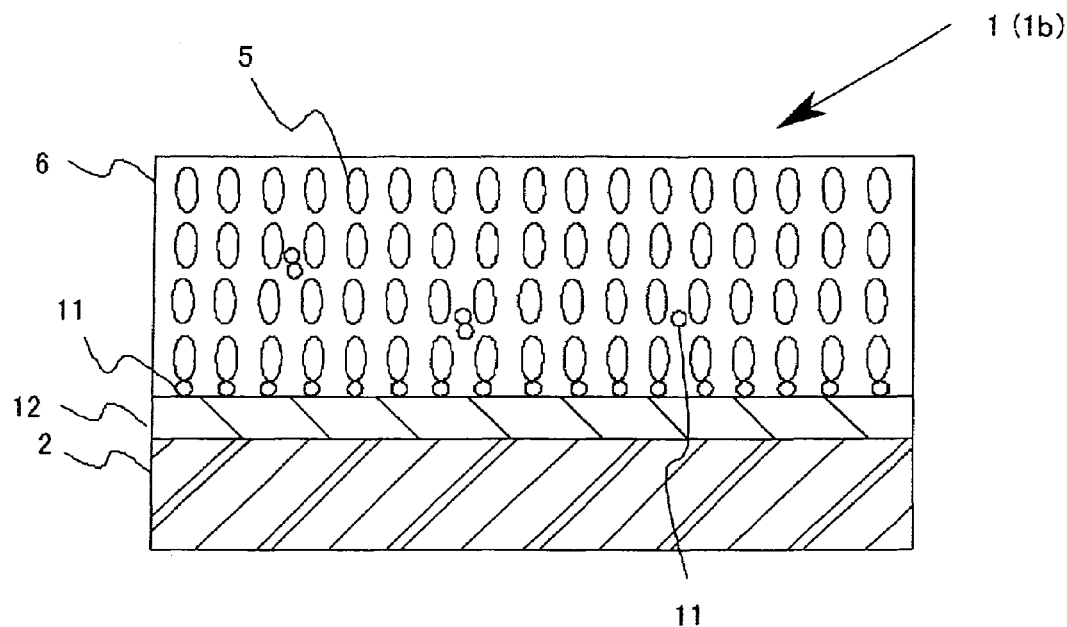
[FIG. 7]
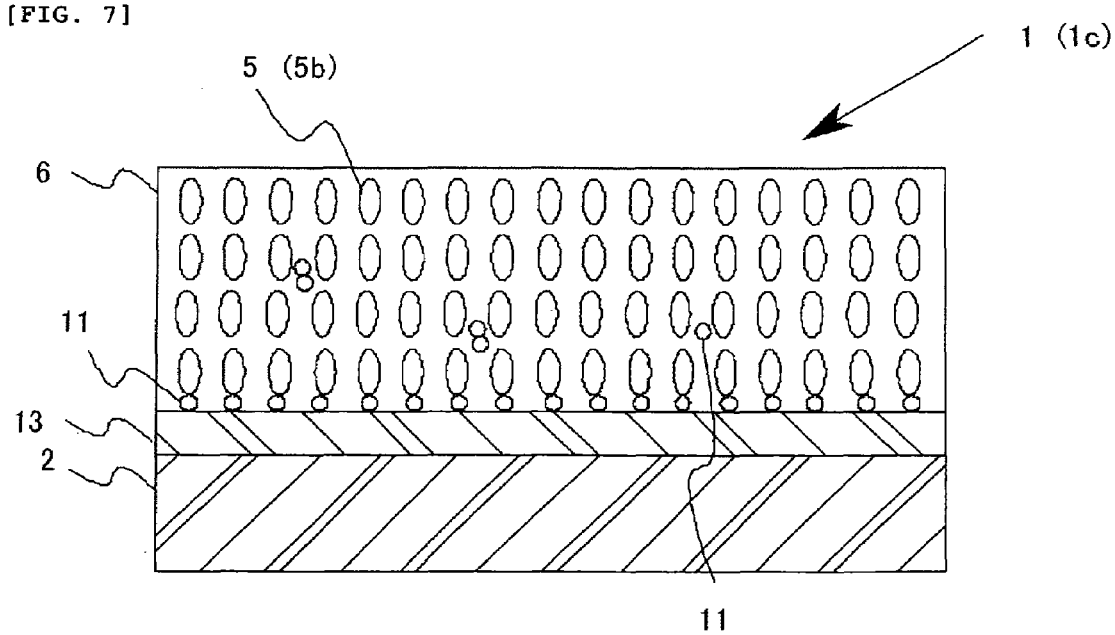

[FIG. 8A]
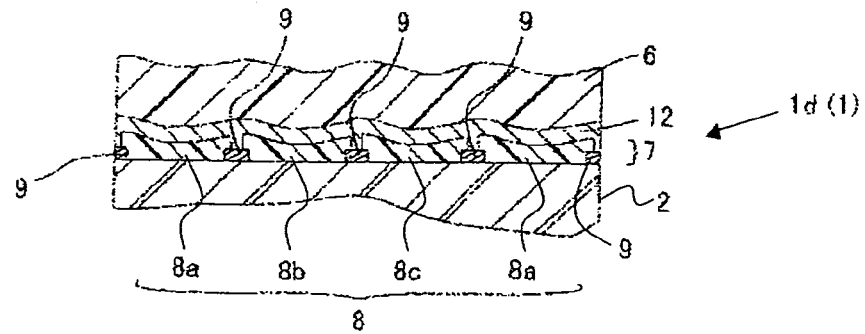
[FIG. 8B]
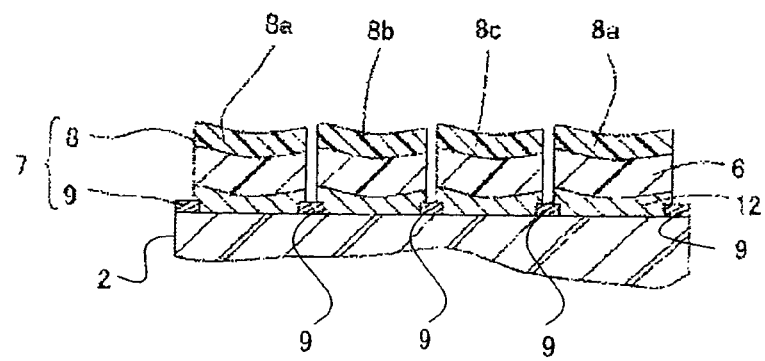
[FIG. 8C]
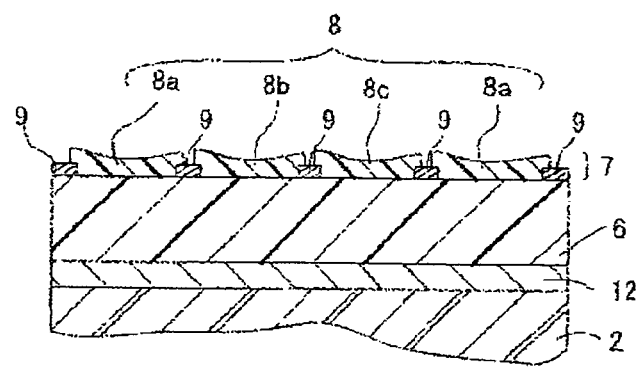

METHOD OF PRODUCING OPTICAL ELEMENT AND APPARATUS FOR PRODUCING OPTICAL ELEMENT

BACKGROUND OF THE INVENTION

1. Field of the Invention

The present invention relates to a method of producing an optical element obtained by laminating a functional layer on a base material and to an apparatus for producing the optical element.

2. Description of the Related Art

A liquid crystal display device (LCD) has found use in a variety of fields such as a television and medical equipment because the device has advantages such as the ease with which the thickness and weight of the device are reduced, the ability of the device to reduce power consumption, and the difficulty with which a flicker occurs. On the other hand, the device involves the emergence of, for example, a problem in that light leak or atone reversal phenomenon occurs depending on the angle at which a user views a liquid crystal display screen, so a viewing angle is narrow, and a problem in that color heterogeneity occurs in the liquid crystal display screen or contrast reduces.

In order to solve the problem, there has been proposed a liquid crystal display device provided with an optical element that controls an outgoing light emitted from a liquid crystal cell and an incident light entered into the liquid crystal cell.

For such the liquid crystal display device, there has been proposed an optical element having a film obtained by orienting and fixing a liquid crystal molecule in a specific direction as well as a film obtained by subjecting a triacetylcellulose (TAC) film to uniaxial stretching or biaxial stretching.

JP 05-142531 A proposes a viewing angle compensation film composed of a nematic liquid crystal polymer whose molecular chain is oriented in a normal direction of the film surface and which has a positive intrinsic refractive index. JP05-142531 A discloses that the viewing angle compensation film may be obtained by: forming a vertical alignment layer on the surface of a glass substrate or the like by using an alkylsilicone-based or fluoroalkylsilicone-based surface treating agent to produce a cell; sealing liquid crystal molecules into the cell; and subjecting the liquid crystal molecules to photopolymerization.

JP2002-174724 A proposes a method of producing a liquid crystal layer in which a polymerizable liquid crystal compound is homeotropically oriented, the method involving applying the liquid crystal compound to a vertical alignment layer formed on a substrate. The method involves the use of a long-chain alkyl-type dendrimer derivative as an agent for forming a vertical alignment layer. In addition, JP 2002-174724 A discloses that a film including a homeotropically oriented liquid crystal film can be obtained by means of the method, and that the film can be used for an optical film such as a retardation film.

JP 2002-174725 A proposes a method of producing a homeotropically oriented liquid crystal film involving: applying, to a substrate provided with no vertical alignment layer, a side-chain type liquid crystal polymer containing a monomer unit containing a liquid crystal fragment side chain and a monomer unit containing a non-liquid crystal fragment side chain; further homeotropically orienting the liquid crystal polymer in a liquid crystal state; and fixing the polymer while the oriented state is maintained.

JP 2003-121852 A proposes a method of producing a homeotropically oriented liquid crystal film involving: forming, on a substrate provided with no vertical alignment layer, a binder layer and an anchor coat layer in the stated order from the side of the substrate; applying a side-chain type liquid crystal polymer to the anchor coat layer for homeotropic orientation; and fixing the polymer while the homeotropically oriented state is maintained. The method involves the use of a polymer as a side-chain type liquid crystal polymer capable of forming a homeotropically oriented liquid crystal layer on a substrate provided with no vertical alignment layer.

SUMMARY OF THE INVENTION

However, the viewing angle compensation film of JP 05-142531 A is obtained after a series of steps of: producing a cell by means of two substrates each having an alignment layer; sealing liquid crystal molecules into the empty cell; vertically orienting the liquid crystal molecules; and subjecting the liquid crystal molecules to photopolymerization while maintaining the oriented state of each of the molecules. The viewing angle compensation film of JP05-142531 A has a problem in that a production cost significantly increases because the film is obtained through a large number of production steps as described above. In addition, the viewing angle compensation film must be fixed by means of an adhesive when used for a liquid crystal display device because it is a film. Accordingly, an increase in contrast of the liquid crystal screen of the liquid crystal display device requires the selection of a special adhesive.

The method of JP 2002-174724 A requires the use of a special material called a long-chain alkyl-type dendrimer derivative upon production of a homeotropically oriented liquid crystal layer through the arrangement of a vertical alignment layer on a substrate. When a homeotropically oriented liquid crystal layer is obtained by means of the method, there arises a problem in that a production cost significantly increases.

A homeotropically oriented liquid crystal film obtained by means of the method described in JP 2002-174725 A is composed of a side-chain type liquid crystal polymer. Even when the polymer is fixed in a homeotropically oriented state, its flowability increases with increasing temperature, and birefringence property is apt to be influenced by heat. Therefore, the temperature range in which desired birefringence property can be maintained is relatively narrow, and the orientation of a liquid crystal polymer in a part where the liquid crystal polymer is fixed is apt to be nonuniform. In this case, it is difficult to use a homeotropically oriented liquid crystal film obtained by means of the method for a liquid crystal display device requested to have high heat resistance, so the number of liquid crystal display devices each of which is capable of using the liquid crystal film is limited. In addition, the method has a problem similar to that of the method described in JP 05-142531 A described above.

In addition, when a homeotropically oriented liquid crystal film obtained by means of the method is used for a liquid crystal display device, attention must be paid in such a manner that the film is not placed in a high-temperature environment, so it is difficult to arrange the film inside the liquid crystal display device. Therefore, a homeotropically oriented liquid crystal film obtained by means of the method of JP 2002-174725 A has a problem in that the number of positions where the film can be installed in a liquid crystal cell is limited.

A homeotropically oriented liquid crystal film obtained by means of the method described in JP 2003-121852 A is composed of a side-chain type liquid crystal polymer, so the method has a problem similar to that of the method described in JP 2002-174725 A described above. In addition, the method has a problem similar to that of the method described in JP 05-142531 A described above.

In addition, when one attempts to arrange a homeotropically oriented liquid crystal film obtained by means of any one of the methods described in JP 05-142531 A, JP 2002-174724 A, JP 2002-174725 A, and JP 2003-121852 A on a liquid crystal display device to expand the viewing angle of a liquid crystal screen, such film must be stuck as a separate body to the liquid crystal display device by newly using an adhesive or the like. The possibility that a member for irregularly reflecting light to a certain degree is arranged increases with growing need for the addition of a separate body. As a result, the possibility that the haze of a liquid crystal cell constituting a liquid crystal display screen becomes high increases. In such case, the possibility that the liquid crystal display device has increased color heterogeneity or reduced contrast in its liquid crystal display screen also increases.

Furthermore, when the liquid crystal display device is capable of color display, a coloring layer provided with coloring pixel portions corresponding to respective colors such as red (R), blue (B), and green (G) is formed in a liquid crystal cell. The occurrence of color heterogeneity, a reduction in contrast, or the like as described above may originate from the fact that such coloring layer has a high haze. None of the methods described in JP 05-142531 A, JP 2002-174724 A, JP 2002-174725 A, and JP 2003-121852 A can reduce the haze of a liquid crystal cell in such case.

When the haze of an optical element constituting the liquid crystal display screen of a liquid crystal display device is reduced to 0.1 or less, the liquid crystal display device can make a general observer viewing the liquid crystal display screen nearly unaware of a reduction in contrast or the occurrence of color heterogeneity in the liquid crystal display screen.

The inventors of the present invention have made extensive studies with a view to providing an optical element capable of expanding the viewing angle of a liquid crystal display screen at a low cost and providing an optical element having a low haze with which a liquid crystal display device with suppressed occurrence of color heterogeneity in a liquid crystal display screen and improved contrast can be produced. As a result, the inventors have tracked a cause for an increase in haze of an optical element. Thus, the inventors have found a method of producing an optical element with which a liquid crystal display device which is capable of expanding the viewing angle of a liquid crystal display screen and which has suppressed occurrence of color heterogeneity and improved contrast can be produced, and an apparatus for producing the optical element, thereby completing the present invention.

An object of the present invention is to provide: a method of producing an optical element the haze of which is efficiently reduced; and an apparatus for producing the optical element.

The gist of the present invention is as follows.

(1) A method of producing an optical element which includes a base material having light transmittance and a functional layer containing a functional substance and laminated on a surface of the base material and in which a state of light passing through the functional layer is changed in accordance with the functional substance, the method comprising: a coating step of coating the surface of the base material with a functional layer composition liquid containing the functional substance to form a coating film; a baking step of baking the base material having the coating film formed on its surface to form the functional layer in which a functional layer-covering layer is formed to cover the functional layer and a light diffusion layer for diffusing light that has passed through the functional layer is formed in a direction from a surface layer of the functional layer-covering layer toward an interface between the functional layer-covering layer and the functional layer; and a covering layer removing step of removing at least the light diffusion layer out of the functional layer-covering layer to be formed in the baking step.

(2) A method of producing an optical element according to item (1), further comprising a re-baking step of baking a portion obtained by excluding the light diffusion layer from a layer composed of the functional layer and the functional layer-covering layer after the covering layer removing step.

(3) A method of producing an optical element according to item (1), wherein the covering layer removing step is performed in such a manner that the functional layer is exposed to a surface.

(4) A method of producing an optical element according to item (2), wherein the covering layer removing step is performed in such a manner that the functional layer is exposed to a surface.

(5) A method of producing an optical element according to item (1), wherein: in the baking step, an interstitial layer having light diffusion property lower than that of the light diffusion layer is formed in the functional layer-covering layer, the interstitial layer being positioned between the light diffusion layer and the functional layer; and the covering layer removing step is performed in such a manner that the interstitial layer is exposed to the surface.

(6). A method of producing an optical element according to item (2), wherein: in the baking step, an interstitial layer having light diffusion property lower than that of the light diffusion layer is formed in the functional layer-covering layer, the interstitial layer being positioned between the light diffusion layer and the functional layer; and the covering layer removing step is performed in such a manner that the interstitial layer is exposed to the surface.

(7) A method of producing an optical element which includes a base material having light transmittance and a birefringence layer capable of birefringence light and laminated on a surface of the base material, the method comprising: a coating step of coating the surface of the base material with a birefringence layer composition liquid containing liquid crystal having polymerizability and an additive containing an orienting agent for imparting orientation to a liquid crystal molecule to form a coating film; an orienting step of imparting orientation to each of liquid crystal molecules in the coating film; a crosslinking step of subjecting the liquid crystal molecules to a crosslinking polymerization reaction while maintaining the orientation of each of the liquid crystal molecules; a baking step of baking the base material having formed thereon the coating film containing the liquid crystal that has been subjected to crosslinking polymerization to form the birefringence layer in which a birefringence layer-covering layer is formed to cover the birefringence layer and a light diffusion layer for diffusing light that has passed through the birefringence layer is formed in a direction from a surface layer of the birefringence layer-covering layer toward an interface between the birefringence layer-covering layer and the birefringence layer; and a covering layer removing step of removing at least the light diffusion layer out of the birefringence layer-covering layer to be formed in the baking step.

(8) A method of producing an optical element according to item (7), further comprising a re-baking step of baking a portion obtained by excluding the light diffusion layer from a layer composed of the birefringence layer and the birefringence layer-covering layer after the covering layer removing step.

(9) A method of producing an optical element according to item (7), wherein: an optical element to be produced by means of the method has an alignment layer containing the orienting agent for imparting orientation to a liquid crystal molecule, the alignment layer being formed between the base material having light transmittance and the birefringence layer; an alignment layer forming step of coating the surface of the base material with an alignment layer composition liquid containing the orienting agent for imparting orientation to a liquid crystal molecule to form the alignment layer is performed before the coating step; and the coating step is performed in such a manner that the birefringence composition liquid is applied onto the alignment layer to form the coating film.

(10) A method of producing an optical element according to item (7), wherein the orienting agent is intended for homeotropically orienting a liquid crystal molecule.

(11) A method of producing an optical element according to item (7), wherein the crosslinking step is performed in an air atmosphere.

(12) A method of producing an optical element according to item (7), wherein the crosslinking step is performed in an inert gas atmosphere.

(13) A method of producing an optical element according to item (7), wherein the covering layer removing step is performed in such a manner that the birefringence layer is exposed to a surface.

(14) A method of producing an optical element according to item (8), wherein the covering layer removing step is performed in such a manner that the birefringence layer is exposed to a surface.

(15) A method of producing an optical element according to item (7), wherein: in the baking step, an interstitial layer having light diffusion property lower than that of the light diffusion layer is formed in the birefringence layer-covering layer, the interstitial layer being positioned between the light diffusion layer and the birefringence layer; and the covering layer removing step is performed in such a manner that the interstitial layer is exposed to the surface.

(16) A method of producing an optical element according to item (8), wherein: in the baking step, an interstitial layer having light diffusion property lower than that of the light diffusion layer is formed in the birefringence layer-covering layer, the interstitial layer being positioned between the light diffusion layer and the birefringence layer; and the covering layer removing step is performed in such a manner that the interstitial layer is exposed to the surface.

(17) A method of producing an optical element according to item (1), wherein the covering layer removing step is performed by means of spin coating using a solvent capable of dissolving the light diffusion layer.

(18) A method of producing an optical element according to item (7), wherein the covering layer removing step is performed by means of spin coating using a solvent capable of dissolving the light diffusion layer.

(19) A method of producing an optical element according to item (1), wherein the covering layer removing step is performed by means of spin coating using a binder solution which is prepared by dissolving, into a solvent, a binder constituting a structure that can be laminated and formed on a surface to be exposed as a result of removal of the light diffusion layer, and which is capable of dissolving the light diffusion layer.

(20) A method of producing an optical element according to item (7), wherein the covering layer removing step is performed by means of spin coating using a binder solution which is prepared by dissolving, into a solvent, a binder constituting a structure that can be laminated and formed on a surface to be exposed as a result of removal of the light diffusion layer, and which is capable of dissolving the light diffusion layer.

(21) A method of producing an optical element according to item (1), wherein the covering layer removing step is performed by means of plasma dry etching.

(22) A method of producing an optical element according to item (7), wherein the covering layer removing step is performed by means of plasma dry etching.

(23) A method of producing an optical element according to item (1), wherein the covering layer removing step is performed by using means for polishing the surface layer with a polishing agent.

(24) A method of producing an optical element according to item (7), wherein the covering layer removing step is performed by using means for polishing the surface layer with a polishing agent.

(25) A method of producing an optical element according to item (7), wherein the base material has a coloring layer.

(26) A method of producing an optical element according to item (7), wherein the base material has a different birefringence layer having birefringence property different from that of the birefringence layer.

(27) An apparatus for producing an optical element comprising: coating film forming means having a mounting container on which a base material having light transmittance is mounted, a coating portion capable of coating a surface of the base material with a functional layer composition liquid containing a functional substance, and a deaerating mechanism via which a gas in the mounting container is deaerated; functional layer forming means having a baking portion for baking the base material having formed thereon the coating film so that the coating film formed on the base material is provided with a layer structure obtained by laminating a functional layer and a functional layer-covering layer; and surface layer removing means having a removing portion for removing a surface layer of the layer structure formed on the base material in a direction toward an interface between the functional layer and the functional layer-covering layer and a stopping portion for stopping operation of the removing portion in accordance with an amount of the removed surface layer.

(28) An apparatus for producing an optical element according to item (27), wherein: the functional layer composition liquid contains liquid crystal having polymerizability with which a crosslinking polymerization reaction occurs through irradiation with ultraviolet light and an additive containing an orienting agent for imparting orientation to a liquid crystal molecule; and the functional layer forming means includes an orientation imparting portion for imparting orientation to a liquid crystal molecule in the coating film and a light irradiation portion for irradiating the coating film with ultraviolet light so that the coating film formed on the base material is provided with the layer structure obtained by laminating the functional layer and the functional layer-covering layer.

(29) An apparatus for producing an optical element according to item (28), wherein: the functional layer forming means includes a gas filling portion for filling surroundings of the coating film with one of air and an inert gas; and the light irradiation portion is arranged in such a manner that the coating film can be irradiated with ultraviolet light in a state where the surroundings of the coating film are filled with one of air and the inert gas.

(30) An apparatus for producing an optical element according to item (27), wherein the removing means comprises spin coating means having a supporting portion for rotatably supporting the base material, a dropping portion for dropping a dissolving solution capable of dissolving the surface layer of the layer structure in accordance with an amount of a surface layer to be removed from the layer structure, a rotation controlling portion for controlling the dissolving solution so that the dissolving solution can be diffused to the surface of the base material by rotating the base material, and a drying portion for drying the surface layer.

(31) An apparatus for producing an optical element according to item (28), wherein the removing means comprises spin coating means having a supporting portion for rotatably supporting the base material, a dropping portion for dropping a dissolving solution capable of dissolving the surface layer of the layer structure in accordance with an amount of a surface layer to be removed from the layer structure, a rotation controlling portion for controlling the dissolving solution so that the dissolving solution can be diffused to the surface of the base material by rotating the base material, and a drying portion for drying the surface layer.

(32) An apparatus for producing an optical element according to item (27), wherein the removing means comprises plasma dry etching means.

(33) An apparatus for producing an optical element according to item (28), wherein the removing means comprises plasma dry etching means.

(34) An apparatus for producing an optical element according to item (27), wherein the removing means comprises polishing means capable of polishing the surface layer of the layer structure.

(35) An apparatus for producing an optical element according to item (28), wherein the removing means comprises polishing means capable of polishing the surface layer of the layer structure.

According to the method of producing an optical element of the present invention, the light diffusion layer as a layer that is the cause for an increase in haze tracked by the inventors of the present invention can be effectively removed, so an optical element the haze of which is efficiently suppressed can be obtained.

According to the method of producing an optical element of the present invention, the re-baking step of re-baking a portion obtained by excluding the light diffusion layer from the layer composed of the functional layer and the functional layer-covering layer is performed after the covering layer removing step of removing the light diffusion layer, so the physical properties of the portion obtained by excluding the light diffusion layer from the layer composed of at least the functional layer and the functional layer-covering layer such as hardness, solvent resistance, and adhesiveness between the functional layer and the base material can be improved.

According to the method of producing an optical element of the present invention, an optical element having a layer in which a liquid crystal molecule is fixed in a homeotropically oriented state, a haze of 0.1 or less, and an increased degree of transparency can be obtained.

In an optical element obtained by means of the production method of the present invention, liquid crystal is fixed in a homeotropically oriented state. Accordingly, the optical element can be used as, for example, an element for controlling the polarized state of light such as an element for controlling a phase difference or an optical compensation element. In consideration of the fact that the scattering of light can be suppressed as described above, the optical element can be a device having a function of controlling a phase difference with improved finesse. In this case, according to the production method, an optical element having a haze of 0.1 or less can be efficiently produced. As a result, a liquid crystal display device capable of reducing light leak with improved finesse can be produced by means of the optical element. Furthermore, a liquid crystal display device with an expanded viewing angle, improved contrast, and suppressed color heterogeneity in its liquid crystal display screen can be produced.

In addition, the birefringence property of an optical element obtained by means of the production method of the present invention is hardly influenced by heat because the optical element can be of a structure in which liquid crystal molecules crosslink each other.

In addition, according to the method of producing an optical element of the present invention, an optical element in which an isotropic layer is formed to cover the surface of a birefringence layer can be obtained. In this case as well, birefringence property is hardly influenced by heat. As a result, the optical element can be used even for an optical instrument to be used in an environment where a temperature is relatively apt to be high such as the inside of a vehicle. Furthermore, the optical element can be arranged even in a liquid crystal panel installed in an optical instrument because the optical element has relatively high heat resistance.

Furthermore, an optical element obtained by means of the production method of the present invention can be laminated and formed integrally by forming a birefringence layer on a member constituting a liquid crystal panel as a base material, and an optical instrument can be designed without the arrangement of any member (phase difference control member) such as a film for controlling a phase difference as a separate body. Arranging a phase difference control member as a separate body requires the use of an adhesive or the like for fixing the member. However, the optical element obtained by means of the production method of the present invention can eliminate the need for such adhesive, and can reduce the possibility of the scattering of light due to an adhesive.

When the optical element obtained by means of the production method of the present invention is provided with a coloring layer, and the resultant is used for a liquid crystal display device, the need to arrange a phase difference control member separate from a member having the coloring layer is eliminated, so the thickness of the liquid crystal display device can be reduced.

According to the method of producing an optical element of the present invention, a haze can be reduced with reliability because substances responsible for an increase in haze agglomerate to be of a layer shape serving as a light diffusion layer, and the light diffusion layer is removed.

In the method of producing an optical element of the present invention, a light diffusion layer can be removed by means of spin coating using a binder solution which is prepared by dissolving, into a solvent, a binder constituting a structure that can be laminated and formed on a surface to be exposed as a result of removal of the light diffusion layer, and which is capable of dissolving the light diffusion layer. Therefore, according to the method of producing an optical element, in the case where a step of subjecting an optical element to processing such as the lamination of a structure on the optical element is scheduled and a solution to be used for the step of subjecting the optical element to processing is capable of dissolving a light diffusion layer, the light diffusion layer can be removed by means of spin coating using the solution.

To be specific, for example, in the case where a step of laminating and forming a spacer as a structure in a predetermined pattern on a surface to be exposed as a result of removal of a light diffusion layer is scheduled and a binder solution prepared by dissolving a binder constituting the spacer into a solvent is capable of dissolving the light diffusion layer, the light diffusion layer can be removed by means of spin coating using the binder solution.

In addition, such production method eliminates the need for separately preparing a solvent for spin coating and the need for washing the solvent, and can simplify a step of processing an optical element.

The apparatus for producing an optical element of the present invention can provide an optical element with a reduced haze because the method of producing an optical element of the present invention can be performed in the apparatus.

BRIEF DESCRIPTION OF THE DRAWINGS

In the accompanying drawings:

FIG. 1 is a schematic view showing the sectional structure of an optical element produced by means of a production method of the present invention;

FIG. 2A is a schematic view showing the sectional structure of a base material and FIG. 2B is a schematic view showing the sectional structure of an example of a base material provided with a functional layer;

FIG. 3 is a schematic view showing the sectional structure of an optical element produced by means of the production method of the present invention;

FIG. 4 is a schematic view showing the state of the optical element produced by means of the production method of the present invention in the production process of the optical element;

FIG. 5A is a schematic view showing the state of an example of the optical element produced by means of the production method of the present invention in the production process of the optical element, FIG. 5B is a schematic view showing a state at the time of a baking step in one example of the production method of the present invention, and FIG. 5C is a schematic view showing a state at the time of a baking step in another example of the production method of the present invention;

FIG. 6 is a schematic view showing an other example of the optical element produced by means of the production method of the present invention;

FIG. 7 is a schematic view showing the sectional structure of an optical element in which a different birefringence layer is additionally laminated; and FIG. 8A is a schematic view showing the sectional structure of an optical element provided with a coloring layer, FIG. 8B is a schematic view showing the sectional structure of another example of the optical element provided with a coloring layer, and FIG. 8C is a schematic view showing another example of the sectional structure of the optical element provided with a coloring layer.

DETAILED DESCRIPTION OF THE PREFERRED EMBODIMENTS

An optical element 1 to be produced in the present invention is constituted by laminating a functional layer 3 having a function of changing the state of light and containing a functional substance on the surface of a base material 2 having light transmittance (FIG. 1).

The base material 2 is composed of a substrate 2a having light transmittance, and may be constituted by a single substrate layer or may be constituted by multiple layers obtained as a result of super imposition of multiple kinds of the substrates 2a. In addition, the base material 2 may have a functional layer 4 having a function different from that of the functional layer 3 formed on each surface of the substrate 2a, or may have the functional layer 4 formed on one surface of the substrate 2a. When the base material 2 is provided with the multiple substrates 2a, the functional layer 4 may be formed between two adjacent substrates out of the multiple substrates 2a (FIGS. 2A and 2B).

An optically isotropic substrate is preferably used for the substrate 2a. A substrate partially provided with a light-shielding region or the like is also available. In addition, the light transmittance of the substrate 2a can be appropriately selected.

The substrate 2a can be appropriately selected from a glass substrate and a plate-like body composed of any one of various materials. To be specific, the substrate 2a may be a plastic substrate composed of polycarbonate, polymethyl methacrylate, polyethylene terephthalate, triacetylcellulose, or the like. Alternatively, a film of polyether sulfone, polysulfone, polypropylene, polyimide, polyamideimide, polyether ketone, or the like can also be used for the substrate. The substrate 2a is preferably no-alkali glass when the optical element is used for a liquid crystal display. A uniaxially or biaxially stretched film can be used as a film to be used for the substrate. A triacetylcellulose (TAC) film having retardation in its film or the like can also be used.

Specific examples of the functional layers 3 and 4 include: a birefringence layer having a function of birefringence light; a coloring layer through which visible light having a wavelength in a predetermined range out of light incident on the functional layer passes; a reflecting plate for reflecting light; and a polarizing plate. In addition, each of the functional layers 3 and 4 may be arranged on the entire surface of the base material 2, or may be arranged partially on the surface of the base material 2.

The functional substance in each of the functional layers 3 and 4 is appropriately selected in accordance with the manner in which the function of each of the functional layers 3 and 4 changes the state of light passing through the layer.

The optical element 1 is produced as described below.

A functional layer composition liquid containing a functional substance constituting the functional layer 3 to be formed on the base material 2 of the optical element 1 is prepared. The surface of the base material 2 (the substrate 2a or the functional layer 4) is coated with the functional layer composition liquid so that a coating film is formed. Then, the base material having the coating film formed on its surface is baked. The baking turns the coating film on the surface of the base material 2 into the functional layer 3. A functional layer-covering layer 18 for covering the functional layer 3 is formed on the surface of the functional layer 3. A light diffusion layer 15 for diffusing light that has passed through the functional layer 3 is formed in the functional layer-covering layer from the surface layer side of the functional layer-covering layer 18 toward an interface between the functional layer-covering layer 18 and the functional layer 3 (FIG. 3).

Then, at least the light diffusion layer 15 out of the functional layer-covering layer 18 is removed. That is, the layer is removed up to a predetermined depth in a direction from the surface layer of the functional layer-covering layer toward the interface between the functional layer-covering layer and the functional layer over the region in which the light diffusion layer 15 is formed. Any one of methods such as: a method involving the use of mechanical polishing means; spin coating; and plasma dry etching is used for the removal. At least the light diffusion layer 15 out of the functional layer-covering layer is removed by means of any one of those methods, whereby the optical element is produced.

Next, hereinafter, detailed description will be given of the case where, in the optical element 1, the functional substance constituting the functional layer 3 is liquid crystal, the functional layer 3 is a birefringence layer in which a liquid crystal molecule is fixed in a homeotropically oriented state, and a birefringence layer-covering layer covering the birefringence layer is formed as a functional layer-covering layer. It should be noted that this optical element may be referred to as an optical element of a first embodiment.

FIG. 4 is a schematic view showing the sectional structure of an optical element 1a of the first embodiment of the present invention.

The optical element 1 (1a) of the first embodiment has a haze of 0.1 or less, and is composed of the base material 2 having light transmittance and a birefringence layer 6 arranged on the base material 2.

The haze of the optical element 1 is a value measured in the thickness direction of the optical element 1. The value for the haze is measured in conformance with JIS K 7136.

As shown in FIG. 4, the birefringence layer 6 forms a cross linked polymer structure obtained by mutually crosslinking molecules of liquid crystal 5 each having a slightly elongated molecular shape in a state where the molecules of the liquid crystal 5 are homeotropically oriented.

A bonding hand showing a state where the molecules of the liquid crystal 5 are bound to each other is not shown in FIG. 4 for convenience.

The degree of crosslinking of the liquid crystal 5 of the birefringence layer 6 is preferably about 80 or more, or more preferably about 90 or more. A degree of crosslinking of the liquid crystal 5 of less than 80 may be unable to maintain uniform orientation sufficiently.

In the birefringence layer 6, the tilt angles of the liquid crystal 5 each serving as a unit constituting a crosslinked polymer structure are desirably such that the tilt angle of a liquid crystal (for example, a liquid crystal 5a) molecule at the position closer to a boundary between the birefringence layer 6 and the base material 2 and the tilt angle of a liquid crystal (for example, a liquid crystal 5b) molecule at the position most distant from the above liquid crystal molecule in the thickness direction (the direction along arrows L and M) of the birefringence layer 6 are substantially equal to each other. In this case, the tilt angles of the respective liquid crystal monomers 5 in the birefringence layer 6 are substantially uniform in the thickness direction. Furthermore, the tilt angles of the liquid crystal monomers 5 in the birefringence layer 6 are more preferably made equal to each other in the thickness direction.

The birefringence layer 6 provides light to be incident on the birefringence layer 6 (incident light) with retardation in association with the anisotropy of the refractive index of each of the liquid crystal 5 constituting the layer 6. The retardation is an optical path difference between ordinary light and extraordinary light occurring in the incident light. The magnitude of the retardation is represented as the product of birefringence Δn (a difference between the refractive index no of the ordinary light and the refractive index ne of the extraordinary light) and the thickness d of the birefringence layer 6.

Therefore, in the birefringence layer 6, the orientation property of each of the molecules of the liquid crystal 5 and the magnitude of retardation can be controlled by appropriately selecting, for example, the kinds of molecules of the liquid crystal 5, the degree of orientation of a liquid crystal molecule, and the thickness of the birefringence layer 6.

The birefringence layer 6 is constituted so as to have a small value for the magnitude of retardation in its thickness direction. To be specific, the magnitude of the retardation is 1 nm or less.

In addition, when the tilt angles of crystal molecules in the birefringence layer 6 are uniformized in the thickness direction of the layer, the crystal molecules are homeotropically oriented uniformly. As a result, a uniformized liquid crystal layer structure can be obtained.

With a view to obtaining the birefringence layer 6 in which liquid crystal molecules are homeotropically oriented with improved uniformity, the magnitude of the retardation is preferably 1 nm or less, more preferably 0.1 nm or less, or ideally zero.

The thickness of the birefringence layer 6 is preferably selected from the range in which the molecules of the liquid crystal 5 can be homeotropically oriented, specifically, the range in which the retardation in the thickness direction is 1 nm or less in an appropriate manner, or more preferably selected from the range in which the retardation is about 0.1 nm or less in an appropriate manner.

Molecules each of which has an unsaturated double bond in its molecular structure and which can be crosslinked in a liquid crystal state (which may be referred to as polymerizable liquid crystal) are used for the molecules of the liquid crystal 5 constituting the birefringence layer 6. Therefore, one having an unsaturated double bond at a terminal of a molecule is used as the polymerizable liquid crystal.

In addition, the birefringence Δn of each of the molecules of the liquid crystal 5 is preferably about 0.03 to 0.20, or more preferably about 0.05 to 0.15. Specific examples of such liquid crystal molecule include compounds represented by the following formulae 1 to 11. In terms of heat resistance, a compound that can be three-dimensionally crosslinked is desirable, and a compound having two or more unsaturated double bonds at a terminal of a molecule is preferably used. Furthermore, multiple kinds of the compounds represented by the following chemical formulae [Chem 1] to [Chem 11] may be selected as the molecules of the liquid crystal 5 constituting the birefringence layer 6.

[Chem 1]

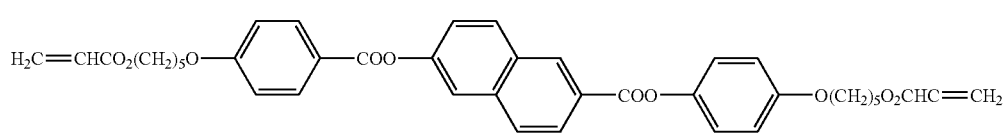

[Chem 2]

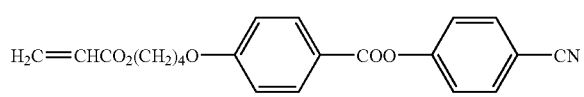

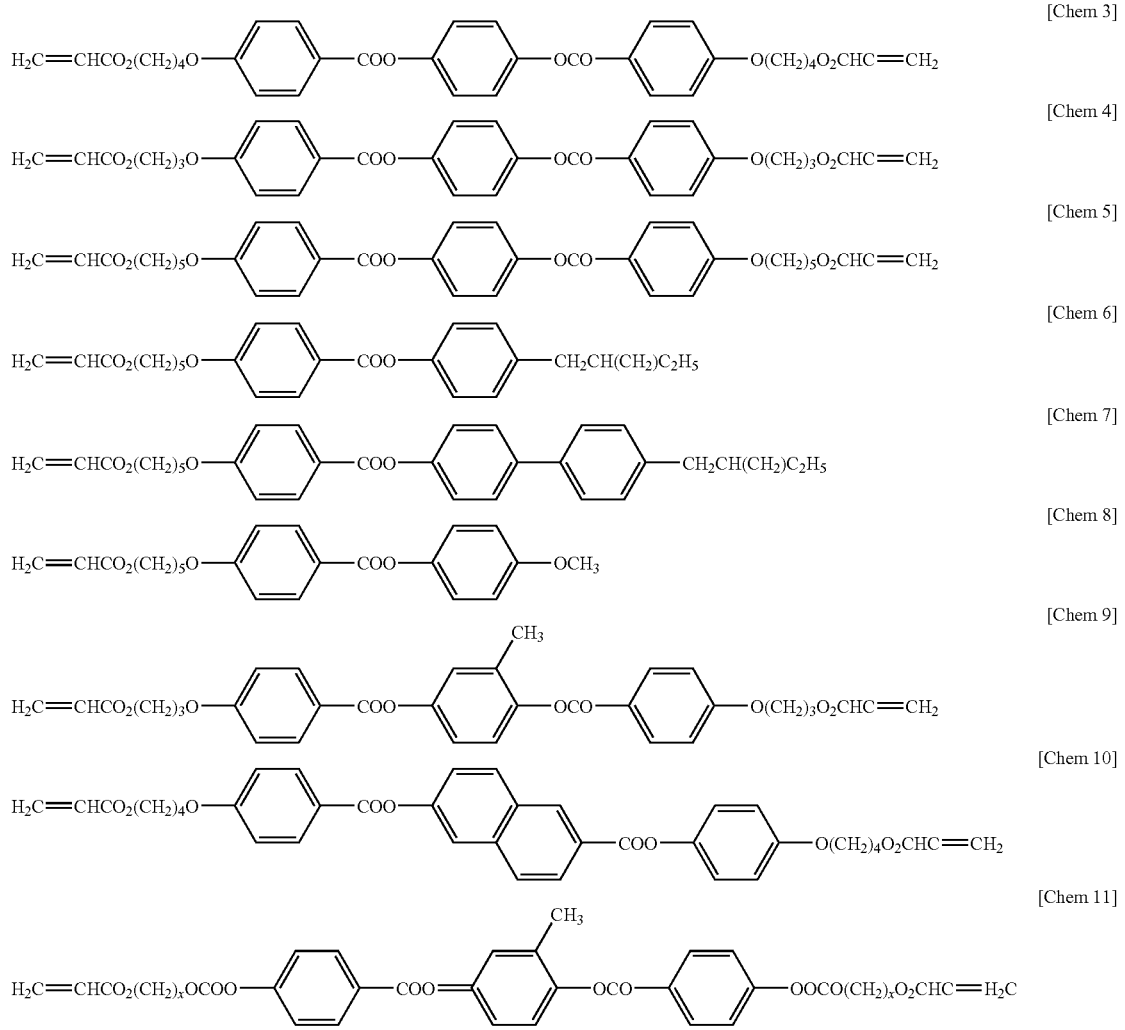

(In the formula, X represents an integer of 4 to 6.)

In this example, the birefringence layer 6 of the present invention can be formed by: applying, to the surface of the base material 2, a birefringence layer composition liquid obtained by blending the liquid crystal monomers 5, the additive 11 including an orienting agent for vertically orienting a liquid molecule (also referred to as a vertically orienting agent), and a solvent to form a coating film; homeotropically orienting the liquid crystal monomers in the coating film; and crosslinking the liquid crystal monomers 5 while maintaining the homeotropically oriented state. The birefringence layer 6 may be formed through patterning on the base material 2 by means of any one of various printing methods or a photolithography method.

The solvent is not particularly limited as long as it is capable of dissolving liquid crystal, and any one of various organic solvents such as toluene can be used; provided, however, that the solvent preferably allows the birefringence layer composition liquid having a uniform thickness to be applied to the surface of the base material.

Specific examples of a vertically orienting agent in the birefringence layer composition liquid include: polyimide, a surfactant, and a coupling agent.

Specific examples of polyimide as a vertically orienting agent include: SE-7511 and SE-1211 manufactured by NISSAN CHEMICAL INDUSTRIES, LTD.; and JALS-2021-R2 manufactured by JSR.

Polyimide having a long-chain alkyl group is preferably used for forming the vertically orienting agent because the thickness of the birefringence layer 6 formed in the optical element can be selected from a wide range.

When the vertically orienting agent is a surfactant, the surfactant has to be capable of homeotropically orienting polymerizable liquid crystal having a rod-like molecular shape; provided, however, that a surfactant or coupling agent of which a vertical alignment layer to be heated together with the birefringence layer is formed must have such heat resistance that it is not decomposed even at the transition temperature at which liquid crystal undergoes a transition to a liquid crystal phase because the liquid crystal must be heated to the transition temperature upon formation of the birefringence layer. In addition, a surfactant or coupling agent of which a vertical alignment layer to be in contact with the birefringence layer is formed preferably has a high affinity for an organic solvent into which liquid crystal is dissolved because the liquid crystal is dissolved into the organic solvent upon formation of the birefringence layer. The surfactant may be a nonionic surfactant, a cationic surfactant, an anionic surfactant, or any other surfactant without any limitation as long as such condition as described above is satisfied. Only a single kind of surfactant may be used, or multiple kinds of surfactants may be used in combination. As in the case of the surfactant, the kind of the coupling agent is not limited, and multiple kinds of coupling agents may be used in combination.

In particular, a surfactant having strong water repellency or strong oil repellency is preferably used for homeotropically orienting polymerizable liquid crystal even when the thickness of the birefringence layer 6 is increased. Examples of the surfactant can include (a) a surfactant having an alkyl chain or long alkyl side chain, (b) a surfactant having an alkyl chain or long alkyl side chain at least part of which is substituted by fluorine, and (c) a surfactant having a side chain containing a fluorine atom.

Specific examples of the surfactant having strong water repellency or oil repellency include (i) lecithin, (ii) octadecyldimethyl (3-trimethoxysilylpropyl)ammonium chloride, (iii) hexadecyl amine, (iv) ADEKAMINE 4DAC-85 (trade name of a surfactant manufactured by Asahi Denka Co., Ltd.), (v) DRYPON 600E (trade name of a surfactant manufactured by NICCA CHEMICAL), (vi) DRYPON Z-7 (trade name of a surfactant manufactured by NICCA CHEMICAL), and (vii) NK Guard NDN-7E (trade name of a surfactant manufactured by NICCA CHEMICAL).

When the vertically orienting agent is a coupling agent, a specific example of the coupling agent includes a silane-coupling agent obtained by hydrolyzing a silane compound such as n-octyltrimethoxysilane, n-octyltriethoxysilane, decyltrimethoxysilane, decyltriethoxysilane, n-dodecyltrimethoxysilane, n-dodecyltriethoxysilane, octadecyltrimethoxysilane, or octadecyltriethoxysilane.

In particular, a coupling agent which strongly homeotropically orients liquid crystal molecules of the birefringence layer 6 can include a fluorine-based silane coupling agent.

A specific example of the coupling agent includes a fluorine-based coupling agent obtained by hydrolyzing a fluorine-based silane compound such as perfluoroalkylsilane, pentafluoroalkylsilane, pentafluorophenyl trimethoxysilane, pentafluorophenyl triethoxysilane, pentafluoropheylpropyl trimethoxylsilane, pentafluorophenylpropyl triethoxysilane, trifluoropropyl trimethoxysilane, trifluoropropyl triethoxysilane, 1H,1H,2H,2H,-perfluorodecyl trimethoxysilane, 1H,1H,2H,2H,-perfluorodecyl triethoxysilane, 1H,1H,2H,2H,-perfluoroocyl trimethoxysilane, 1H,1H,2H,2H,-perfluoroocyl triethoxysilane, 3-(peptafluoroisopropoxy)propyl trimethoxysilane, or 3-(peptafluoroisopropoxy)propyl triethoxysilane.

The refractive index layer composition liquid may be added with a photopolymerization initiator or a sensitizer as required.

Examples of the photopolymerization initiator include: benzyl (or bibenzoyl); benzoin isobutyl ether; benzoin isopropyl ether; benzophenone; benzoylbenzoic acid; methyl benzoyl benzoate; 4-benzoyl-4'methyldiphenylsulfide; benzyl methyl ketal; dimethylaminomethyl benzoate; 2-n-butoxyethyl-4-dimethylamino benzoate; isoamyl p-dimethylamino benzoate; 3,3'-dimethyl-4-methoxybenzophenone; methylobenzoyl formate; 2-methyl-1-(4-(methylthio)phenyl)-2-morpholinopropane-1-one; 2-benzyl-2-dimethylamino-1-(4-morpholinophenyl)-butane-1-one; 1-(4-dodecylphenyl)-2-hydroxy-2-methylpropane-1-one; 1-hydroxycyclohexylphenylketone; 2-hydroxy-2-methyl-1-phenylpropane-1-one; 1-(4-isopropylphenyl)-2-hydroxy-2-methylpropane-1-one; 2-chlorothioxanthone; 2,4-diethylthioxanthone; 2,4-diisopropylthioxanthone; 2,4-dimethylthioxanthone; isopropylthioxanthone; and 1-chloro-4-propoxythioxanthone.

When a photopolymerization initiator is loaded into the birefringence layer composition liquid, the loading of the photopolymerization initiator is in the range of 0.01 to 10 wt %. The loading of the photopolymerization initiator is preferably such that damage to the orientation of a liquid crystal molecule is reduced to the extent possible. In view of this point, the loading is in the range of preferably 0.1 to 7 wt %, or more preferably 0.5 to 5 wt %.

When a sensitizer is loaded into the birefringence layer composition liquid, the loading of the sensitizer can be appropriately selected from the range in which the orientation of a liquid crystal molecule is not largely damaged. To be specific, the loading is selected from the range of 0.01 to 1 wt %.

In addition, only one kind of photopolymerization initiator (or sensitizer) may be used, or two or more kinds of photopolymerization initiators (or sensitizers) may be used in combination.

In this example, the optical element 1 can be produced as described below.

At first, the liquid crystal 5 serving as polymerizable liquid crystal and an additive 11 are dissolved into a solvent so that a birefringence layer composition liquid is prepared.

The birefringence layer composition liquid is applied to the base material 2 having light transmittance to produce a coating film by means of any one of methods such as various printing methods (including die coating, bar coating, slide coating, and roll coating) and spin coating. Then the coating film is dried.

The base material to which the birefringence layer composition liquid has been applied is dried to form a coating film for a birefringence layer. At this time, the base material to which the birefringence layer composition liquid has been applied can be air-dried under atmospheric pressure as well as dried under reduced pressure. However, it is preferable to be applied under atmospheric pressure because liquid crystal molecules are homeotropically oriented.

When the surface of the vertical alignment layer-formed base material has high water repellency or high oil repellency, the wettability of the surface of the vertical alignment layer-formed base material to which the birefringence layer composition liquid is to be applied may be improved in advance through UV washing or a plasma treatment to the extent that liquid crystal can be homeotropically oriented.

Next, the liquid crystal monomers in the coating film for a birefringence layer are homeotropically oriented. (FIG. 5(a))

To be specific, the coating film for a birefringence layer is heated so that the temperature of the coating film for a birefringence layer becomes equal to or higher than the temperature (liquid crystal phase temperature) at which the liquid crystal in the coating film becomes a liquid crystal phase and lower than the temperature at which the liquid crystal in the coating film becomes an isotropic phase (liquid phase). Thus, the liquid crystal is homeotropically oriented. At this time, a method of heating the coating film for a birefringence layer is not particularly limited. A method involving placing the coating film in a heating atmosphere is permitted. A method involving heating the coating film with infrared light is also permitted.

A method of homeotropically orienting the liquid crystal is not limited to the above method. For example, depending on a liquid crystal monomer in the coating film for a birefringence layer and the state of the coating film, a method involving drying the coating film for a birefringence layer under reduced pressure or a method involving applying an electric field or a magnetic field to the coating film for a birefringence layer from a predetermined direction can be employed for realizing the homeotropic orientation.

When the coating film for a birefringence layer is dried under reduced pressure so that a liquid crystal monomer is homeotropically oriented, establishing a decompressed state can bring the coating film for a birefringence layer into a supercooled state. As a result, the coating film for a birefringence layer can be additionally cooled to room temperature while the homeotropically oriented state of a liquid crystal monomer in the coating film is maintained. In this case, a state where the liquid crystal is homeotropically oriented is maintained efficiently until the liquid crystal monomers are subjected to a crosslinking reaction.

The liquid crystal homeotropically oriented in the coating film for a birefringence layer is subjected to a crosslinking reaction as described below.

The crosslinking reaction progresses through the irradiation of the coating film for a birefringence layer with light having a wavelength to which a liquid crystal monomer is sensitive (referred to as a method A). At this time, the wavelength of light with which the coating film for a birefringence layer is irradiated is appropriately selected in accordance with the kind of a liquid crystal monomer in the coating film. The light irradiated on the coating film for a birefringence layer is not limited to a single color light but the light having a constant range of the wavelength including a wavelength to which a liquid crystal monomer is sensitive.

Alternatively, the crosslinking reaction of the liquid crystal may be performed by means of a method involving the steps of: irradiating the coating film for a birefringence layer with light having a wavelength to which the liquid crystal is sensitive while heating the coating film up to the liquid crystal phase temperature in the air atmosphere, to thereby partially progress the crosslinking reaction (referred to as a partial crosslinking step); cooling the coating film for a birefringence layer to the temperature (Tc) at which the liquid crystal becomes a crystal phase after the partial crosslinking step; and additionally irradiating the coating film for a birefringence layer with light having a wavelength to which the liquid crystal is sensitive in this state, to thereby progress and complete the crosslinking reaction (referred to as a method B). The above-mentioned temperature Tc is the temperature at which the liquid crystal becomes a crystal phase in the coating film for a birefringence layer before the progress of the crosslinking reaction.

In the partial crosslinking step, the crosslinking reaction proceeds to the extent that the homeotropic orientation of the liquid crystal in the coating film for a birefringence layer is maintained even when the coating film is cooled to the temperature Tc. Therefore, the degree to which the crosslinking reaction proceeds in the partial crosslinking step is appropriately selected depending on, for example, the kind of the liquid crystal in the coating film for a birefringence layer and the thickness of the coating film. In the partial crosslinking step, the crosslinking reaction is preferably caused to proceed in such a manner that the degree of crosslinking of the liquid crystal becomes about 5 to 50.

Each of the above methods A and B is performed in the air atmosphere.

In this case, the crosslinking reaction of the liquid crystal is preferably performed while the coating film for a birefringence layer is heated to a temperature lower than the temperature at which the liquid crystal undergoes a phase transition from a liquid crystal phase to an isotropic phase by 1 to 10° C. This action can reduce the disturbance of the homeotropic orientation of the liquid crystal at the time of the crosslinking reaction. In addition, in view of the foregoing, the temperature at which the crosslinking reaction is performed is more preferably a temperature lower than the temperature at which the liquid crystal undergoes a phase transition from a liquid crystal phase to an isotropic phase by 3 to 6° C.

When the crosslinking reaction of the liquid crystal is performed in the air atmosphere, the crosslinking reaction of the liquid crystal is inhibited to a certain degree by oxygen in the air, so the rate of the crosslinking reaction of the liquid crystal reduces as the position at which the crosslinking reaction occurs approaches an interface between the coating film for a birefringence layer and air. As a result, a portion where a liquid crystal molecule not subjected to a crosslinking reaction is present can be formed in the surface layer of the liquid crystal.

The base material having laminated thereon the coating film for a birefringence layer in which liquid crystal molecules are crosslinked is introduced into a baking device such as an oven device, and is baked under atmospheric pressure in the air atmosphere. A baking temperature is 200 to 250° C.; provided that the temperature is preferably 220 to 230° C. because a boundary between a functional layer and a functional layer-covering layer becomes clear after the baking. A baking time is 30 to 150 minutes; provided that the time is preferably 60 to 120 minutes owing to the same reason as that for the baking temperature.

Upon baking of the base material having laminated thereon the coating film for a birefringence layer, the base material is introduced into the baking device and baked while the base material is leveled. Even when the liquid crystal in the coating film for a birefringence layer forms a homeotropically oriented state, in a state where the base material is slanted, the orientation of the liquid crystal is slanted with respect to the surface of the base material owing to the self weight of a liquid crystal molecule, so the homeotropic orientation of the liquid crystal may be disturbed.

At the time of the baking, a birefringence layer-covering layer serving as the functional layer-covering layer 18 is formed to cover the birefringence layer 6 serving as a layer including the liquid crystal 5 the molecules of which are crosslinked to maintain orientation. The light diffusion layer 15 for diffusing light is formed from the surface layer of the birefringence layer-covering layer toward an interface between the birefringence layer-covering layer and the birefringence layer. Furthermore, an interstitial layer 16 different from the light diffusion layer 15 and the birefringence layer 6 are formed between them. The interstitial layer 16 is an isotropic layer 17 formed as described below: liquid crystal molecules which are not crosslinked each undergo a phase transition from a liquid crystal phase to an isotropic phase owing to heating at the time of baking so that they are directly fixed in a laminar fashion (FIG. 5B). In FIG. 5B, reference numeral 20 denotes a bonding hand upon crosslinking of the molecules of the liquid crystal 5.

The light diffusion layer 15 has a haze higher than those of the birefringence layer 6 and the isotropic layer 17, and is of composition different from that of each of the birefringence layer 6 and the isotropic layer 17. The light diffusion layer 15 is probably formed as described below. That is, a low-molecular-weight component or an additive such as a vertically orienting agent used for forming the birefringence layer 6 has been dispersed into the coating film for a birefringence layer before baking, but exudes to the surface side of the coating film for a birefringence layer at the time of the baking, so it is formed into a layer shape at the position of the surface layer of the birefringence layer-covering layer to be formed at the time of the baking.

In the crosslinking reaction of the liquid crystal, each of the above methods A and B can be performed in not only the air atmosphere but also an inert gas atmosphere.

In this case, the crosslinking reaction of the liquid crystal is performed by irradiating the coating film with light having a wavelength to which the liquid crystal is sensitive without heating. The crosslinking reaction may be performed by irradiating the coating film for a birefringence layer with light having a wavelength to which the liquid crystal is sensitive while heating the coating film to a liquid crystal phase temperature.

The case where the crosslinking reaction of the liquid crystal is performed in the air atmosphere is preferable because a facility for carrying out the step of performing the crosslinking reaction can be simplified and the production cost of an optical element can be suppressed as compared to the case where the crosslinking reaction is performed in an inert gas atmosphere.

In addition, in the case where the crosslinking reaction of the liquid crystal is performed in an inert gas atmosphere, the crosslinking reaction can be caused to proceed nearly completely as compared to the case where the crosslinking reaction is performed in the air atmosphere (FIG. 5C). When the base material having formed thereon the coating film for a birefringence layer in which the crosslinking reaction of the liquid crystal has been caused to proceed sufficiently in an inert gas atmosphere is baked, the birefringence layer-covering layer is formed to cover the surface of the birefringence layer. At this time, the light diffusion layer 15 is formed on the birefringence layer-covering layer, but nearly no isotropic layer is formed on the layer.

As described below, the base material having the birefringence layer 6 formed thereon as a result of baking is subjected to the removal of a portion from the surface layer of the birefringence layer-covering layer to a predetermined depth, whereby at least the light diffusion layer 15 is removed and an optical element is produced.

The light diffusion layer is removed by means of a method such as: a method involving the use of polishing means; spin coating; or plasma dry etching.

When the light diffusion layer 15 is removed by using polishing means, a method such as tape polishing or lapping polishing can be used. To be specific, a film or the like is brought into contact with the light diffusion layer 15, and the portion where the film or the like and the light diffusion layer 15 are in contact with each other is rubbed with the film or the like with a physical stress applied from the outside to the light diffusion layer 15, whereby the light diffusion layer 15 is mechanically removed.

When the light diffusion layer 15 is removed by means of spin coating, a solvent capable of dissolving the light diffusion layer 15 of the base material having formed thereon the birefringence layer-covering layer is dropped. Then, the base material is rotated so that the base material is provided with a centrifugal force. The solvent is spread over the entire surface of the light diffusion layer 15 through the centrifugal force to dissolve the light diffusion layer 15. Furthermore, the base material having formed thereon the birefringence layer-covering layer is washed, whereby the light diffusion layer 15 is dissolved and removed.

In addition, when the light diffusion layer 15 is removed by means of spin coating, a binder solution prepared by dissolving a binder into a solvent may be used instead of the solvent.

Here, the optical element to be obtained is one obtained by: laminating the birefringence layer and the birefringence layer-covering layer on the base material; and removing the light diffusion layer from the birefringence layer-covering layer (referred to as a light diffusion layer-removed body). A surface to be exposed as a result of removal of the light diffusion layer is processed, and the resultant may be incorporated into a liquid crystal display device before use. For example, a structure such as a columnar body (spacer) is laminated and formed on the light diffusion layer-removed body in a predetermined patter, whereby the optical element is processed and incorporated into a liquid crystal display device.

The binder is a substance (composition substance) constituting a structure when the structure is formed on the light diffusion layer-removed body so that the optical element is processed as described above. Examples of an available binder include: various photo-setting or thermosetting resins such as an acrylic resin, an epoxy-based resin, and polyimide; and two-liquid setting resins. More specifically, examples of such available binder include: a coloring resist for a color filter; a resist for a black matrix; a resist for a spacer; and a resist for a protective film. Propylene glycol monomethyl ether acetate (PGMEA) or the like can be used as the solvent.

When the above binder solution is used, the following procedure may be adopted. That is, the light diffusion layer 15 is removed by means of spin coating from the base material having the birefringence layer 6 formed thereon as a result of baking, a state where the binder solution is applied to the birefringence layer 6 is established, the resultant is dried under reduced pressure in the state, and the resultant is baked on a hot plate. Alternatively, a processing involving: additionally baking, on a hot plate, the base material having the birefringence layer 6 formed thereon as a result of baking; and curing the binder solution by means of light or heat to form a layer may be performed. In this case, a pattern may be formed in a layer to be formed through development or the like.

When the light diffusion layer 15 is removed by means of plasma dry etching, the light diffusion layer 15 is removed by: introducing oxygen as an etching gas into a vacuum chamber having an air outlet in a plasma dry etching device; applying a high-frequency voltage to excite to the etching gas (oxygen) so that plasma is generated; generating a radical and the like by means of the plasma; colliding the radical and the like with the light diffusion layer 15 while reacting the radical and the like with a substance constituting the light diffusion layer 15, to thereby produce a volatile substance; and exhausting the produced volatile substance to the outside from the air outlet.

Any one of a barrel type device, a parallel plate type device, a down flow type device, and like other devices can be appropriately adopted for the plasma dry etching device.

Such methods of removing the light diffusion layer 15 as described above, that is, the respective methods such as: a method involving the use of polishing means; spin coating; and plasma dry etching may be appropriately used in combination.

Thus, the optical element is formed as a result of exposure of the birefringence layer 6 as the functional layer 3, or the isotropic layer 17 as the interstitial layer 16, to the surface.

According to the production method of the present invention, an optical element from which the light diffusion layer 15 is removed can be obtained. That is, an optical element in which only the birefringence layer 6 is formed on the surface of the base material 2 or an optical element in which the isotropic layer 17 is formed to cover the birefringence layer 6 can be obtained.

In addition, removing the light diffusion layer 15 as a layer to be responsible for the diffusion of light as described above can reduce the haze of the optical element. In addition, a function of changing the state of light in the optical element is attributable to the birefringence layer, so there is nearly no possibility of a reduction in the function due to the removal of the light diffusion layer 15.

According to the production method, an optical element in which the isotropic layer 17 is formed to cover the birefringence layer is obtained. At this time, the isotropic layer 17 can suppress the possibility of any flaw in the birefringence layer due to an external stress or the possibility of any distortion in the birefringence layer due to external heat, so an optical element resistant to an external force or heat can be obtained.

When the isotropic layer 17 is formed between the birefringence layer and the light diffusion layer 15, the isotropic layer 17 may be removed as in the case of the light diffusion layer 15. The removal can provide an optical element in which only the birefringence layer is formed on the surface of the base material, and can reduce the thickness of the optical element.

In addition, in the production method of the present invention, a re-baking step of baking (re-baking) a portion obtained by excluding the light diffusion layer from a layer composed of the birefringence layer and the birefringence layer-covering layer may be performed after the production of one obtained by: forming the birefringence layer and the birefringence layer-covering layer on the base material; and removing the light diffusion layer formed in the birefringence layer-covering layer (light diffusion layer-removed body) as described above.

The re-baking step can be specifically performed, for example, by introducing the light diffusion layer-removed body into a baking device such as an oven device and by baking the body.

In the re-baking step, the re-baking is performed at a temperature of preferably 200° C. to 250° C., or more preferably 210° C. to 240° C. When the temperature at which the re-baking is performed is lower than 200° C., the birefringence layer may be insufficiently cured. When the temperature at which the re-baking is performed is higher than 250° C., the possibility that the color of the birefringence layer changes to yellow increases.

The re-baking is performed for a time period of preferably 20 minutes to 90 minutes, or more preferably 30 minutes to 60 minutes. When the time period for which the re-baking is performed is shorter than 20 minutes, the birefringence layer may be insufficiently cured. When the time period for which the re-baking is performed is 90 minutes or longer, the possibility that the color of the birefringence layer changes to yellow increases.

In the production method, the re-baking step is performed. As a result, the degree to which the birefringence layer formed on the surface of the base material cures increases, so the hardness of the layer additionally is improved. In addition, the birefringence layer hardly cracks upon lamination of an ITO electrode on the coating film (ITO resistance). Furthermore, the solvent resistance and adhesiveness of the birefringence layer are also improved.

In the optical element of the first embodiment produced by means of the production method of the present invention, a vertical alignment layer may be interposed between the base material and the birefringence layer (FIG. 6). An optical element thus constituted may be referred to as an optical element of a second embodiment.

An optical element 1b of the second embodiment is obtained by: arranging a vertical alignment layer 12 as an alignment layer for vertically orienting a liquid crystal molecule on the surface of the base material 2; and laminating the birefringence layer 6 on the vertical alignment layer 12.

The vertical alignment layer 12 is formed by: applying a liquid containing polyimide to be used as a layer composition liquid by means of a method such as flexographic printing or spin coating; and curing the applied liquid.

The layer composition liquid containing polyimide is specifically the same as that used for forming the birefringence layer 6 in the optical element of the first embodiment, and examples of the liquid include: SE-7511 and SE-1211 manufactured by NISSAN CHEMICAL INDUSTRIES, LTD.; and JALS-2021-R manufactured by JSR.

The thickness of the vertical alignment layer 12 is preferably in the range of about 0.01 to 1 μm. A thickness of the vertical alignment layer 12 of less than 0.01 μm may make it difficult to homeotropically orient liquid crystal. In addition, a thickness of the vertical alignment layer 12 in excess of 1 μm may cause the vertical alignment layer 12 itself to reflect light irregularly to reduce the light transmittance of the optical element significantly.

The vertical alignment layer 12 may be formed of a surfactant or coupling agent as well as polyimide.

The same surfactant or coupling agent as that used for forming the birefringence layer 6 in the optical element of the first embodiment can be used.

Each of the base material 2 and the birefringence layer 6 is constituted in the same manner as in each of the base material and the birefringence layer in the optical element 1a of the first embodiment.

It should be noted that the degree to which a molecule of the liquid crystal 5 is homeotropically oriented increased as the molecule approaches the vertical alignment layer 12 because the birefringence layer 6 is formed on the vertical alignment layer 12. In addition, homeotropic orientation weakens when a molecule of the liquid crystal 5 is distant from the vertical alignment layer 12. That is, when even a molecule of the liquid crystal 5 distant from the vertical alignment layer 12 is strongly homeotropically oriented, in the birefringence layer 6, the tilt angles of the molecules of the liquid crystal 5 are uniformized, and the molecules of the liquid crystal 5 are uniformly homeotropically oriented.

The optical element 1 of the second embodiment can be produced as described below.

At first, a layer composition liquid containing polyimide is prepared by means of such material as described above. The liquid is applied to the surface of a base material having light transmittance by means of a method such as flexographic printing or spin coating to produce a coating film for a vertical alignment layer. Furthermore, the coating film for a vertical alignment layer is cured to produce a vertical alignment layer-formed base material in which the vertical alignment layer is formed on the base material.

Next, liquid crystal serving as polymerizable liquid crystal and polyimide are dissolved into a solvent such as toluene to prepare a birefringence layer composition liquid. The solvent to be used is preferably one enabling the birefringence layer composition liquid to be applied at a uniform thickness to the vertical alignment layer 3.

The loading of the molecules of the liquid crystal 5 in the birefringence layer composition liquid is preferably in the range of 10 to 50 wt % although the preferable range varies depending on, for example, a coating method, a thickness, and the kind of the solvent.

In the birefringence layer composition liquid, a compounding ratio (weight ratio) of polyimide having an alkyl group at a side chain thereof to the liquid crystal is 1/7 to 1/3. The loading of the polyimide in the birefringence layer composition liquid is preferably 12.5 to 25 wt %, or more preferably 15 to 22.5 wt % with respect to the total amount of the polymerizable liquid crystal. A loading of the polyimide of less than 12.5 wt % may make it difficult to obtain a birefringence composition that is sufficiently uniformly homeotropically oriented. A loading in excess of 25 wt % may reduce light transmittance.

The birefringence layer composition liquid is applied to the vertical alignment layer-formed base material by means of any one of methods such as various printing methods (including die coating, bar coating, slide coating, and roll coating) and spin coating. The base material to which the birefringence layer composition liquid has been applied is dried to form a coating film for a birefringence layer. At this time, the base material to which the birefringence layer composition liquid has been applied can be air-dried under atmospheric pressure.

When the surface of the vertical alignment layer-formed base material has high water repellency or high oil repellency, the wettability of the surface of the vertical alignment layer-formed base material to which the birefringence layer composition liquid is to be applied may be improved in advance through UV washing or a plasma treatment to the extent that liquid crystal can be homeotropically oriented as in the case of the production of the optical element of the first embodiment.

Then, the liquid crystal in the coating film for a birefringence layer is homeotropically oriented as in the case of the method of producing the optical element of the first embodiment, and the resultant is subjected to a crosslinking reaction and baked. Then, the light diffusion layer 15 is removed, whereby the optical element of the second embodiment is produced.

In the optical element 1 of the first or second embodiment to be produced by means of the production method of the present invention, the birefringence layer 6 has a structure obtained by crosslinking and polymerizing the liquid crystal 5 while maintaining the homeotropically oriented state of the liquid crystal. Suppose xyz orthogonal coordinates with the thickness direction of the birefringence layer 6 as a z axis. In this case, a refractive index nx in an x axis direction and a refractive index ny in a y axis direction have substantially the same value, and a refractive index nz in the z axis direction can be made larger than the refractive indices nx and ny. Therefore, in the optical element 1, the birefringence layer 6 can be a layer having birefringence property with which the refractive indices satisfy the relationship of nz>nx=ny, that is, a layer having an optical axis in its thickness direction (z axis direction) and uniaxial birefringence property. The layer 6 can be caused to function as a so-called "+C plate" and as a member having a phase difference control function with which the retardation of light can be optically compensated.

The optical element 1 of the first or second embodiment has a layer obtained by fixing liquid crystal molecules that are in homeotropically oriented states, and has a haze of 0.1 or less.

Therefore, the optical element has an improved degree of transparency in its thickness direction. In addition, the occurrence of a portion with a discontinuous refractive index in the thickness direction of the optical element is suppressed, so the scattering and diffusion of light passing through the optical element in the thickness direction can be suppressed.

The optical element obtained by means of the production method of the present invention has liquid crystal fixed in a homeotropically oriented state. Therefore, the optical element can be used as, for example, an element for controlling the polarized state of light such as an element for controlling a phase difference or an optical compensation element. In consideration of the fact that the scattering of light can be suppressed as described above, the optical element can be a device having a function of controlling a phase difference with improved finesse. As a result, a liquid crystal display device capable of reducing light leak with improved finesse can be produced by means of the optical element. Furthermore, a liquid crystal display device with an expanded viewing angle, improved contrast, and suppressed color heterogeneity in its liquid crystal display screen can be produced.

The optical element 1 obtained by means of the production method of the present invention can reduce an influence of heat on birefringence property so that heat resistance is improved when the birefringence layer 6 has a crosslinked structure. In particular, when the isotropic layer 17 is formed to cover the birefringence layer 6, an improving effect on heat resistance is large.

The optical element 1 obtained by means of the production method of the present invention can be laminated and formed integrally on a member constituting a liquid crystal panel. As a result, an optical instrument can be designed without the arrangement of any phase difference control member as a separate body.

The optical element of the first or second embodiment obtained by means of the production method of the present invention may be constituted in such a manner that the base material 2 forms the functional layer 4 and the functional layer 4 is a different birefringence layer having refractive index property different from that of the birefringence layer (referred to as a third embodiment).

As shown in FIG. 7, in an optical element 1c of the third embodiment, the base material 2 includes a different birefringence layer 13 serving as the functional layer 4 and the substrate 2a.

The birefringence layer 13 in the optical element 1c of the third embodiment may be a layer having birefringence property different from that of the birefringence layer in the first or second embodiment (+C plate).

To be specific, the different birefringence layer 13 may be a layer having birefringence property with which the above-described refractive indices satisfy the relationship of nz=nx<ny or nz=ny<nx, that is, a layer functioning as a so-called "+A plate". Alternatively, the layer may be a layer having birefringence property with which the above-described refractive indices satisfy the relationship of nz<nx=ny, that is, a layer functioning as a so-called "−C plate".

The above-described layer functioning as the so-called "+A plate" can be obtained by: forming a coating film for forming a horizontal alignment layer of, for example, a resin material capable of horizontally orienting liquid crystal on the surface of a base material or on a birefringence layer; subjecting the surface of the coating film for forming a horizontal alignment layer to a rubbing treatment or a light orientation treatment to produce a horizontal alignment layer; applying a solution prepared by dissolving liquid crystal into a solvent to the horizontal alignment layer; and fixing the solution in a homogeneously oriented state.

The above-described layer functioning as the so-called "−C plate" can be obtained by: applying a solution prepared by dissolving liquid crystal and a chiral agent into a solvent to the surface of a base material or to a birefringence layer; and fixing the solution.

The chiral agent is added for orienting a liquid crystal molecule in a helical fashion. When the liquid crystal molecule takes a helical pitch in an ultraviolet region, a specific reflected color occurs owing to a selective opposition phenomenon. Therefore, the loading of the chiral agent is preferably such amount that the selective opposition phenomenon occurs in the ultraviolet region.

The optical element of the third embodiment is produced in the same manner as in the optical element of the first or second embodiment except that the base material 2 includes the different birefringence layer 13 and the substrate 2a.

The optical element of the third embodiment produced by means of the production method of the present invention is obtained by laminating layers different from each other in birefringence property. When a liquid crystal display device provided depending on the optical element is produced, upon acknowledgement of light that has passed through the liquid crystal display device, a change in magnitude of retardation depending on the position at which an observer views the passed light can be efficiently suppressed.

In the optical element, of the first, second, or third embodiment obtained by means of the production method of the present invention, a coloring layer may be formed on the surface of the base material 2 or of the optical element (referred to as a fourth embodiment).

The optical element of the fourth embodiment will be described by taking the case where a coloring layer 7 is formed as a functional layer 4 on the substrate 2 of a base material 2a as an example (FIG. 8A).

FIG. 8A is a schematic view showing the sectional structure of an example of the optical element of the fourth embodiment.

An optical element 1b has a substrate 2a as a base material 2, and a coloring layer 7 is formed on one surface of the substrate. The coloring layer 7 is composed of a coloring pixel portion 8 through which visible light in a predetermined wavelength region passes and a light-shielding portion 9 (which may be referred to as a black matrix or a BM).

The coloring pixel portion 8 is formed by arranging coloring pixels through which light beams having the wavelength ranges of the respective colors (red, green, and blue) pass (referred to as a red coloring pixel 8a, a green coloring pixel 8b, and a blue coloring pixel 8c) in a predetermined pattern. The arrangement mode of the red coloring pixel 8a, the green coloring pixel 8b, and the blue coloring pixel 8c each constituting the coloring pixel portion 8 can be selected from various arrangement patterns such as a stripe type pattern, a mosaic type pattern, and a triangle type pattern.

Coloring pixels through which light beams having the wavelength ranges of the complementary colors for the respective colors pass can be used instead of those coloring pixels (8a, 8b, and 8c).

The coloring pixel portion 8 is formed by patterning the coating film of a coloring material dispersion liquid prepared by dispersing a coloring material for each of the coloring pixels (8a, 8b, and 8c) of the respective colors into a solvent into a predetermined shape by means of, for example, a photolithography method.

The coloring pixel portion 8 can also be formed by applying a coloring material dispersion liquid for each of the coloring pixels (8a, 8b, and 8c) of the respective colors in a predetermined shape as well as a photolithography method.

The light-shielding portion 9 prevents the coloring pixels (8a, 8b, and 8c) from being superimposed on one another, and fills a gap between adjacent coloring pixels to suppress the leak of light (leaked light) from a position between the adjacent coloring pixels. In addition, the light-shielding portion suppresses the light degradation or the like of an active device when the optical element is used for a member for a liquid crystal display device of an active matrix drive system.

Therefore, the light-shielding portion 9 is formed in such a manner that regions corresponding to the positions at which the coloring pixels are arranged on the surface of the substrate 2a are compartmentalized for the respective coloring pixels (8a, 8b, and 8c) in a plan view. In addition, the coloring pixels (8a, 8b, and 8c) of the respective colors are arranged in accordance with the positions at which the coloring pixels are formed in the regions on the surface of the substrate 2a compartmentalized by the light-shielding portion 9 in such a manner that the regions are covered with the coloring pixels in a plan view.

The light-shielding portion 9 can be formed by patterning a metal thin film having light-shielding property or light-absorbing property such as a metal chromium thin film or a tungsten thin film in a predetermined shape onto a substrate surface. In addition, the light-shielding portion can be formed by printing an organic material such as a black resin in a predetermined shape.

The coloring layer 7 is not limited to such layer including coloring pixels for multiple colors as described above, and may be constituted by means of a coloring pixel for a single color. In this case, the coloring layer 7 may be free of the light-shielding portion 9.

The optical element of the fourth embodiment is produced in the same manner as in the optical element of the first, second, or third embodiment except that the base material 2 includes the coloring layer 7 and the substrate 2a.

The optical element of the fourth embodiment has been described by taking the case where all of the coloring pixel portion 8 and the light-shielding portion 9 constituting the coloring layer 7 are arranged on a substrate as an example. However, the present invention is not limited thereto. As shown in FIG. 5B, the optical element may be formed by: forming only the light-shielding portion 9 in the coloring layer on a substrate 2a to provide a base material 2. In such case, this optical element can be produced as described below.

At first, in the same manner as in the production method of the optical element of the first, second, or third embodiment, the base material 2 having laminated thereon the birefringence layer 6 is obtained. Then, furthermore, the coloring pixel portion 8 is formed on the surface of the birefringence layer 6 or of the isotropic layer 17, whereby the optical element is produced.

According to the optical element of the fourth embodiment, the coloring layer 7 on the substrate 2a can be covered with the birefringence layer 4. In this case, the heat resistance of the coloring pixel portion 8 to be covered with the vertical alignment layer 3 or with the birefringence layer 4 can be improved because the heat resistance of the birefringence layer 4 is relatively high.

When the optical element is provided with a coloring layer, as shown in FIG. 5C, the coloring layer 7 may be laminated on the birefringence layer 4 of the optical element 1a in addition to the above case.

In this case, such optical element is produced by producing the optical element of the first, second, or third embodiment and by forming the coloring layer on the optical element.

The method of producing each optical element 1 described above can be performed by means of such production apparatus as described below.

The production apparatus includes: coating film forming means for forming a coating film on the surface of the base material 2; functional layer forming means for forming the coating film formed on the base material 2 into a layer structure obtained by laminating the functional layer 3 and the functional layer-covering layer 18; and surface layer removing means for removing at least the light diffusion layer 15 out of the functional layer-covering layer. The surface layer removing means is connected to the functional layer forming means.

The coating film forming means has: a mounting container on which the base material 2 having light transmittance is mounted; a coating portion capable of coating the surface of the base material 2 with a functional layer composition liquid containing a functional substance; and a deaerating mechanism via which a gas in the mounting container is deaerated. A spinner, a bar coating device, or the like can be specifically used as the coating portion. A specific example of the deaerating mechanism includes a decompression mechanism having a lid body for hermetically sealing a container and a vacuum pump connected to the container.

The functional layer forming means has a baking portion for baking the base material having formed thereon the coating film.

Specific examples of the baking portion include baking devices such as an oven device.

When the functional layer composition liquid contains liquid crystal having polymerizability and an additive containing an orienting agent for imparting orientation to a liquid crystal molecule, the functional layer forming means includes an orientation imparting portion for imparting orientation to a liquid crystal molecule in the coating film and a light irradiation portion for irradiating the coating film with ultraviolet light.

A specific example of the orientation imparting portion includes a heating device equipped with a heating portion such as an infrared heater and a temperature sensor. In this heating device, the temperature sensor measures the temperatures of the coating film, and the heating portion heats the coating film until the measured temperature of the coating film becomes a temperature between a liquid crystal phase temperature and the temperature at which the liquid crystal becomes a liquid phase. As a result, the liquid crystal in the coating film is homeotropically oriented.

A specific example of the light irradiation portion includes an ultraviolet lamp.

The functional layer forming means may include a gas filling portion for filling the surroundings of the coating film with air or an inert gas. A specific example of the gas filling portion includes one equipped with: a container on which a base material can be mounted to be hermetically sealed; a gas introducing device connected to the container to introduce a gas such as air or an inert gas into the container; a gas exhaust device connected to the container to exhaust the gas from the container; and a valve for controlling the amount of the gas to be introduced or exhausted, the valve being arranged at a site of connection between the container and the gas introducing device or the gas exhaust device. In this case, the light irradiation portion is arranged in such a manner that the coating film can be irradiated with ultraviolet light in a state where the surroundings of the coating film are filled air or the inert gas. This arrangement can be specifically realized by, for example, arranging an ultraviolet lamp as the light irradiation portion in the container of the gas filling portion.

The surface layer removing means has: a removing portion for removing the surface layer of the layer structure formed on the base material in the direction toward an interface between the functional layer and the functional layer-covering layer; and a stopping portion for stopping the operation of the removing portion in accordance with the amount of the removed surface layer.

Specific examples of the removing portion include: a polishing device such as a chemical mechanical polishing device (CMP); a spin coating device; and a plasma dry etching device. Those devices may be appropriately combined.

For example, when the removing portion is a chemical mechanical polishing device, the removing portion includes: a support member for supporting a substrate with its layer structure directed downward; a pressing member for pressing a polishing pad from below the support member; a polishing slurry dropping portion for dropping a polishing slurry (polishing agent) to the polishing pad; and a rotation mechanism via which the support member and the pressing member rotate in the directions opposite to each other. At this time, the surface of the layer structure formed on the base material to be polished is directed downward and pressed against the polishing pad. The polishing agent is dropped from the polishing slurry dropping portion to the polishing pad. Then, the base material and the polishing pad rotate in the directions opposite to each other. As a result, the surface of the layer structure formed on the substrate is removed with the aid of the chemical action and mechanical action of the polishing agent.

In addition, for example, when the removing portion is a spin coating device, the removing portion includes: a supporting portion for rotatably supporting a substrate; a dropping portion for dropping a dissolving solution capable of dissolving the surface layer of the layer structure in accordance with the amount of a surface layer to be removed from the layer structure; a rotation controlling portion for controlling the dissolving solution so that the dissolving solution can be diffused to the surface of the substrate by rotating the base material; and a drying portion for drying the surface layer.

The stopping portion acknowledges the amount of the surface layer of the layer structure formed on the base material removed toward the interface between the functional layer and the functional layer-covering layer. When the acknowledged amount reaches a predetermined amount, the stopping portion stops the operation of the removing portion.

The stopping portion may include: a haze measuring device equipped with haze value storing means; and an operation power switch for the removing portion. The haze value storing means stores a predetermined haze value. In addition, the operation power switch for the removing portion is turned off when the haze value to be measured by the haze measuring device is lower than the predetermined value after the operation of the removing portion. In other words, when an expected haze value upon removal of a light diffusion layer responsible for an increase in haze value is stored in advance in the haze value storing means, the surface layer removing means can be constituted in such a manner that the operation of the removing portion stops upon removal of the light diffusion layer.

The optical element to be produced by means of the production method of the present invention has been described above in detail by taking the case where a birefringence layer is formed as a functional layer as an example. In the production method of the present invention, an optical element in which a coloring layer is formed as a functional layer may also be produced. In this case, the coloring layer to be formed in the optical element to be produced by means of the production method of the present invention is constituted in the same manner as in the coloring layer in the optical element of the fourth embodiment, and is constituted by coloring pixel portions composed of coloring pixels for the respective colors of R, G, and B, and by a light-shielding portion.

An optical element provided with a coloring layer as a functional layer is produced as described below.

At first, a light-shielding portion is formed in a predetermined pattern on the surface of a base material. The portion can be formed in the same manner as in the optical element of the fourth embodiment.

Next, a coloring material dispersion liquid is prepared for each of the coloring pixel portions for the respective colors of R, G, and B by dispersing a coloring material constituting a coloring pixel portion into a solvent. The surface of the base material is coated with the coloring material dispersion liquid, whereby a coating film is produced.

Upon formation of the coating film through coating with the coloring material dispersion liquid, the coating film is patterned into a predetermined shape on the surface of the base material. At this time, the patterning can be performed by means of a photolithography method or a method involving applying a coloring material dispersion liquid for a coloring pixel for each color to have a predetermined shape. For example, when the patterning is performed by means of a photolithography method, the coating film can be specifically patterned in accordance with a predetermined pattern of a mask by: exposing the coating film to light through the mask having the pattern; and developing the resultant.

The coating film patterned into a predetermined shape is produced for each of the respective colors of R, G, and B by means of each of the coloring material dispersion liquids for the respective colors of R, G, and B.

The base material having formed thereon the coating film patterned for each of the respective colors of R, G, and B is introduced into a baking device such as an oven and baked. The baking results in the formation of layers to serve as coloring pixel portions for the respective colors in the coating film on the surface of the base material. Those layers and the light-shielding portion form a coloring layer as a functional layer. Then, a functional layer-covering layer is formed to cover the coloring layer. The functional layer-covering layer constitutes a light diffusion layer for diffusing light.

The light diffusion layer is removed from the base material having formed thereon the coloring layer. That is, the layer is removed up to a predetermined depth in the direction from the surface layer of the base material toward the interface between the base material and the coloring layer over the region in which the light diffusion layer is formed.

At this time, the depth by which the above layer is removed is appropriately selected in accordance with various conditions such as the concentration of a pigment constituting a coloring pixel and the amount of an additive.

Any one of methods such as: a method involving the use of mechanical polishing means; spin coating; and plasma dry etching is used for the removal of the light diffusion layer as in the case of the production of an optical element having formed therein a birefringence layer as a functional layer.

Thus, an optical element in which a coloring layer provided with a light-shielding portion and a coloring pixel portion has been formed on a base material is produced.

The method of producing an optical element is applicable to not only the above-described case where the coating film of a coloring material dispersion liquid is patterned for each of the colors of R, G, and B before the light diffusion layer is removed but also the case where the light diffusion layer is removed every time the coating film of a coloring material dispersion liquid is patterned for each color.

EXAMPLES

Example 1

Production of Vertical Alignment Layer

A vertical alignment layer solution (JALS-2021-R2 manufactured by JSR) is diluted with γ-butyrolactone by two-fold to prepare a layer composition liquid.

The layer composition liquid is applied to a glass substrate as a base material to produce a coating film. The glass substrate having formed thereon the coating film is baked at 180° C. for 1 hour, whereby a vertical alignment layer-formed base material is obtained.

[Production of Coating Film for Forming Birefringence Layer]

A vertical alignment layer solution (JALS-2021-R2 manufactured by JSR) is diluted with diethylene glycol dimethyl ether by eight-fold to prepare a solution containing polyimide.

20 parts by weight of the compound shown in the above chemical formula (Chem 11) (provided that X represented 6) as a polymerizable liquid crystal molecule (polymerizable liquid crystal) showing a nematic liquid crystal phase, 0.8 part by weight of a photopolymerization initiator ("IRGACURE 907" manufactured by Ciba-Geigy), 59.2 parts by weight of chlorobenzene as a solvent, and 20 parts by weight of the solution containing polyimide are mixed to prepare a birefringence layer composition liquid.

The vertical alignment layer-formed base material was installed in a spin coater (trade name "1H-360S" manufactured by MIKASA), and the birefringence layer composition liquid was applied to the alignment layer by means of spin coating. Thus, the birefringence layer composition liquid was applied to the vertical alignment layer-formed base material, whereby a coating film for forming a birefringence layer was produced.

[Formation of Homeotropically Oriented State of Liquid Crystal]

The vertical alignment layer-formed base material on which the coating film for forming a birefringence layer had been formed was heated at 100° C. for 3 minutes. Then, it was confirmed that a liquid crystal molecule in the coating film for forming a birefringence layer underwent a transition to a liquid crystal phase to form an oriented state. At this time, it is was visually observed that the color of the coating film for forming a birefringence layer changed from white to transparent.

[Crosslinking Reaction of Liquid Crystal]

Next, in a nitrogen atmosphere, the coating film for forming a birefringence layer in a transparent state was irradiated with ultraviolet light having an output of 20 mW/cm$^2$ for 10 seconds by means of an ultraviolet irradiation device (trade name "TOSCURE 751" manufactured by HARISON TOSHIBA LIGHTING Corp.). Thus, the liquid crystal in the coating film for forming a birefringence layer was subjected to a crosslinking polymerization reaction so that the orientation of a liquid crystal molecule was fixed. As a result, a base material having formed thereon a crosslinked liquid crystal layer containing the crosslinked liquid crystal was produced.

[Baking of Base Material Having Formed Thereon Crosslinked Liquid Crystal Layer]

The base material having formed thereon the crosslinked liquid crystal layer was heated and baked at 230° C. for 1 hour by means of a baking device ("circulating hot air oven KLO-60M" manufactured by AS ONE CORPORATION). As a result, the crosslinked liquid crystal layer was provided with a layer structure in which a birefringence layer-covering layer was laminated on a birefringence layer.

After the baking, the thickness of the crosslinked liquid crystal layer laminated on the surface of the base material was measured. As a result, the thickness was about 1.5 µm. It should be noted that the thickness was measured by means of a stylus level difference meter (product name "DEKTAK" manufactured by Sloan).

[Removal of Surface Layer]

After having been baked, the base material having laminated thereon the crosslinked liquid crystal layer was mounted in the vacuum chamber of a plasma dry etching device ("DEA-506T" manufactured by ANELVA Corporation), and was subjected to plasma dry etching under the following conditions so that a portion up to a depth of 1,300 Å from the surface layer was removed. As a result, an optical element having formed therein a birefringence layer was obtained.

| Etching gas | oxygen |
| Etching gas flow rate | 60 sccm |
| Etching gas pressure | 30 mTorr |
| Electric power to be applied | 500 W |
| Etching time | 3 min |

The retardation, light leak, and haze of the resultant optical element were measured as described below.

[Measurement of Retardation]

The optical element was installed in a retardation measuring machine so that the retardation of the optical element was measured with respect to the thickness direction of the birefringence layer at a measurement wavelength of 550 nm.

At this time, the magnitude of the retardation of the optical element was about 0 (zero) nm.

In addition, the magnitude of the retardation of the optical element was measured with respect to the direction slanted by 45° relative to the thickness direction of the birefringence layer in the same manner as that described above.

At this time, the magnitude of the retardation of the optical element was about 50 nm.

A "KOBRA-21" manufactured by Oji Scientific Instruments was used as the retardation measuring machine.

[Measurement of Light Leak]

The optical element was interposed between two polarizing plates arranged in a crossed nicol fashion, and was irradiated with light from the side of one polarizing plate. Whether light passed through the two polarizing plates when the optical element was rotated was observed.

Upon rotation of the optical element, the travelling direction of light passing through a polarizing plate to be incident on the optical element and the thickness direction of the optical element are kept nearly parallel to each other.

At this time, nearly no light passing through the two polarizing plates was observed, and nearly no light leak was observed.

The measurement of the retardation and the measurement of the light leak show that a liquid crystal molecule is homeotropically oriented in the birefringence layer of the optical element.

[Measurement of Haze]

The haze of the optical element was measured in conformance with JIS K 7136 by installing the optical element in a haze measuring machine. An "NDH-2000" manufactured by NIPPON DENSHOKU was used as the haze measuring machine.

The haze of the optical element of Example 1 was 0.06.

In addition, in the base material before the removal of the surface layer provided with a layer structure obtained by laminating the birefringence layer-covering layer on the birefringence layer, a change in magnitude of retardation and a change in haze in the thickness direction from the surface of the surface layer of the birefringence layer-covering layer toward an interface between the surface layer and the base material were measured.

At this time, in a region ranging from the surface of the surface layer to a position with a depth of about 1,300 Å toward the side of the interface between the surface layer and the base material, nearly no retardation change was observed, but haze reduced gradually. In a region ranging from the position with a depth of about 1,300 Å toward the side of the interface between the surface layer and the base material to the interface between the surface layer and the base material, retardation reduced gradually, but no change in haze was observed. Therefore, the following can be found. That is, in the above layer structure, in the region ranging from the surface of the surface layer to the position with a depth of about 1,300 Å toward the side of the interface between the surface layer and the base material, the light diffusion layer 15 for diffusing light is present to constitute a birefringence layer-covering layer, and, in the region ranging from the position with a depth of about 1,300 Å toward the side of the interface between the surface layer and the base material to the interface between the surface layer and the base material, a birefringence layer in which a liquid crystal molecule is homeotropically oriented is formed.

Example 2

An optical element was produced in the same manner as in Example 1 except that a surface layer was removed by means of spin coating.

The spin coating was performed as described below.

A base material in which 0.015 ml/cm² of γ-butyrolactone had been dropped on the surface of a crosslinked liquid crystal layer was rotated at a number of revolutions of 2,000 rpm for 10 sec so that γ-butyrolactone was spread nearly uniformly over the surface of the crosslinked liquid crystal layer. Furthermore, the resultant was dried without any change for 5 min.

The thickness of the crosslinked liquid crystal layer laminated on the surface of the base material in the optical element obtained by means of spin coating was measured. As a result, the thickness was about 1.35 µm. The thickness after the removal of the surface layer was measured by means of the stylus level difference meter used in Example 1.

The retardation, light leak, and haze of the resultant optical element were measured in the same manner as in Example 1.

The optical element had a magnitude of retardation with respect to the thickness direction of the birefringence layer of nearly 0 (zero) nm and a retardation with respect to the direction slanted by 45° relative to the thickness direction of 50 nm. In addition, nearly no light leak was observed. The haze of the optical element was 0.06.

Example 3

An optical element was produced in the same manner as in Example 1 except that a surface layer was removed by means of polishing means.

A chemical mechanical polishing device ("LGP-612" manufactured by Lapmaster SFT Corp.) was used as the polishing means. A PLANERLITE-4000 (manufactured by Fujimi) was used as a polishing agent, and an IC1400 (manufactured by Rodel) was used as a polishing pad.

A portion up to a depth of 1,300 Å from the surface layer was removed by means of the polishing means from a base material having laminated thereon a crosslinked liquid crystal layer, whereby an optical element formed therein a birefringence layer was produced.

The retardation, light leak, and haze of the resultant optical element were measured in the same manner as in Example 1.

The optical element had a magnitude of retardation with respect to the thickness direction of the birefringence layer of nearly 0 (zero) nm and a retardation with respect to the direction slanted by 45° relative to the thickness direction of 50 nm. In addition, nearly no light leak was observed. The haze of the optical element was 0.08.

Example 4

An optical element was produced in the same manner as in Example 1 except that: the crosslinking reaction of liquid crystal was performed in the air atmosphere; and a portion up to a depth of 1,300 Å from the surface layer of a crosslinked liquid crystal layer was removed by means of plasma dry etching.

The retardation, light leak, and haze of the resultant optical element were measured in the same manner as in Example 1.

The optical element had a magnitude of retardation with respect to the thickness direction of the birefringence layer of nearly 0 (zero) nm and a retardation with respect to the direction slanted by 45° relative to the thickness direction of 50 nm. In addition, nearly no light leak was observed. The haze of the optical element was 0.08.

In addition, in the base material before the removal of the surface layer provided with a layer structure obtained by laminating the birefringence layer-covering layer on the birefringence layer, a change in magnitude of retardation and a change in haze in the thickness direction from the surface of the surface layer of the birefringence layer-covering layer toward an interface between the surface layer and the base material were measured. In a region ranging from the surface of the surface layer of the birefringence layer-covering layer to a position with a depth of about 1,300 Å toward the side of the interface between the surface layer and the base material, retardation did not change, and haze reduced. In a region ranging from the position with a depth of about 1,300 Å from the surface toward the side of the interface between the surface layer and the base material to a position with a depth of about 2,700 Å toward the side of the interface between the surface layer and the base material, neither retardation nor haze was observed to change. In a region ranging from the position with a depth of about 2,700 Å from the surface toward the side of the interface between the surface layer and the base material to the interface between the surface layer and the base material, retardation reduced gradually, but no change in haze was observed.

Therefore, the following can be found. That is, in the resultant optical element, in the region ranging from the surface to the position with a depth of about 1,300 Å toward the side of the interface between the surface layer and the base material, the light diffusion layer is present. In the region ranging from about 1,300 to 2,700 Å from the surface toward the side of the interface between the surface layer and the base material, the isotropic layer 17 is present. In the region ranging from the position with a depth of about 2,700 Å toward the side of the interface between the surface layer and the base material to the interface between the surface layer and the base material, a birefringence layer in which a liquid crystal molecule is homeotropically oriented is formed.

Example 5

An optical element was produced in the same manner as in Example 4 except that a surface layer was removed by means of spin coating.

The spin coating was performed in the same manner as in Example 2.

The thickness of the crosslinked liquid crystal layer laminated on the surface of the base material in the optical element obtained by means of spin coating was measured in the same manner as in Example 2. As a result, the thickness was about 1.35 μm. That is, a layer up to a depth of about 1,500 Å from the surface layer was removed. The thickness after the removal of the surface layer was measured by means of the stylus level difference meter used in Example 1.

The retardation, light leak, and haze of the resultant optical element were measured in the same manner as in Example 4.

The optical element had a magnitude of retardation with respect to the thickness direction of the birefringence layer of nearly 0 (zero) nm and a retardation with respect to the direction slanted by 45° relative to the thickness direction of 50 nm. In addition, nearly no light leak was observed. The haze of the optical element was 0.08.

Example 6

An optical element was produced in the same manner as in Example 4 except that a surface layer was removed by means of polishing means.

The polishing means was performed in the same manner as in Example 3.

A portion up to a depth of 1,300 Å from the surface layer was removed by means of the polishing means, whereby an optical element having formed therein a birefringence layer was produced.

The retardation, light leak, and haze of the resultant optical element were measured in the same manner as in Example 4.

The optical element had a magnitude of retardation with respect to the thickness direction of the birefringence layer of nearly 0 (zero) nm and a retardation with respect to the direction slanted by 45° relative to the thickness direction of 50 nm. In addition, nearly no light leak was observed. The haze of the optical element was 0.08.

Example 7

An optical element was produced in the same manner as in Example 4 except that spin coating was performed as described below.

The spin coating was performed by: dropping, onto the surface of the crosslinked liquid crystal layer formed on the base material, a binder solution having a binder concentration of 0.015 ml/cm$^2$ prepared by dissolving a resist for a spacer NN-780 (manufactured by JSR) as a binder to be used for forming a columnar body (spacer) into PGMEA; coating the surface with the solution by means of spin coating at room temperature and a number of revolutions of 500 rpm for 10 sec; and spreading the binder solution over nearly the entire region of the surface of the crosslinked liquid crystal layer.

The crosslinked liquid crystal layer formed on the base material was subjected to spin coating. A columnar body was formed by means of a pattern determined as described below (columnar body forming step). Thus, an optical element with a surface layer having formed thereon a columnar body was produced.

The columnar body forming step was performed by: drying the base material in which the binder solution had been spread over the surface layer of the crosslinked liquid crystal layer under pressure reduced from atmospheric pressure to 0.15 Torr; baking the resultant on a hot plate at 100° C. for 3 minutes; subjecting the resultant to pattern exposure with ultraviolet light by means of a predetermined mask pattern to cure the resultant on the pattern; and developing the resultant to result in the pattern formation of a columnar body.

The thickness of the crosslinked liquid crystal layer laminated on the surface of the base material in the resultant optical element was measured for a portion with no columnar body formed therein by means of a stylus level difference meter (product name "DEKTAK" manufactured by Sloan).

As a result, the thickness of the crosslinked liquid crystal layer was about 1.35 μm.

In addition, the retardation, light leak, and haze of the resultant optical element were measured in the same manner as in Example 1.

The optical element had a magnitude of retardation with respect to the thickness direction of the birefringence layer of nearly 0 (zero) nm and a retardation with respect to the direction slanted by 45° relative to the thickness direction of 50 nm. In addition, nearly no light leak was observed. The haze of the optical element was 0.07.

Comparative Example 1

An optical element was produced in the same manner as in Example 1 except that a surface layer was not removed.

The haze of the resultant optical element was measured in the same manner as in Example 1.

The haze of the optical element of Comparative Example 1 was 1.0.

Next, an example in the case where an optical element is obtained by re-baking a light diffusion layer-removed body in which a light diffusion layer has been removed will be described.

Example 8

At first, in the same manner as in Example 5, a light diffusion layer was removed from a birefringence layer-covering layer, whereby a light diffusion layer-removed body was produced. The body was re-baked in an oven at a temperature of 230° C. for 30 minutes (re-baking), whereby an optical element was produced.

The hardness, solvent resistance, adhesiveness, and heat resistance of the birefringence layer formed on the surface of the base material were measured for the resultant optical element.

[Hardness]

The hardness of the birefringence layer for the optical element was measured as universal hardness by means of a Fischer scope (product number; H100VS-HCU Xprog manufactured by FISCHER INSTRUMENTS K.K.) in conformance with DIN50359 under the measurement conditions including a load pressure of 1.5 mN/40 sec and a retention time of 5 sec.

The universal hardness of the birefringence layer before the re-baking and that after the re-baking were measured. The universal hardness before the re-baking was 144.1 while the universal hardness after the re-baking was 161.2.

[Solvent Resistance]

The optical element obtained as a result of re-baking was immersed in a solvent for 5 minutes. For comparison, the optical element not immersed in a solvent was prepared. Each of the optical elements was mounted on a hot plate at 120° C. for 5 minutes, and was baked in an oven at 220° C. for 20 minutes. A retardation amount in the direction slanted by 45° relative to the thickness direction of each optical element was measured, and a difference between both values (phase difference) was measured. Furthermore, in the same manner as that described above, the optical element not subjected to re-baking (optical element of Example 5) was immersed in a solvent for 5 minutes, and, for comparison, the optical element not immersed in a solvent was prepared. Then, a difference between retardation amounts (phase difference) was measured. Each of γ-butyrolactone and N-methylpyrrolidone (NMP) was used as the solvent. As a result, in the case of the optical element not subjected to re-baking, the phase difference was about 5 nm in each solvent. However, in the case of the optical element obtained as a result of re-baking, the phase difference was merely about 1 nm in each solvent, so an improvement in solvent resistance was observed.

[Adhesiveness]

Adhesiveness between the surface of a base material and a birefringence layer in an optical element was measured through a tape peel test.

The tape peel test was performed by: sticking a tape with a width of 18 mm (Scotch tape (registered trademark) (product number; #810) manufactured by 3M) to the surface of the optical element; interposing the birefringence layer between the tape and the base material; physically peeling the tape off of the optical element; and observing whether the birefringence layer peeled off the surface of the base material.

The tape peel test was continuously performed for each of the optical element obtained as a result of re-baking and the optical element before re-baking (optical element of Example 5). The number of times of the tape peel test causing initial peeling was measured.

In the case where the tape peel test was performed for the optical element before re-baking, the birefringence layer did not peel off the base material even after the tape peel test had been continuously performed 20 times or 25 times. Peeling was not observed until the tape peel test was continuously performed 30 times. However, only about 2% of the birefringence layer peeled off the base material, so adhesiveness was good. In the case of the optical element obtained as a result of re-baking, peeling was not observed after the tape peel test had been continuously performed 30 times. Peeling was not observed even after the tape peel test had been continuously performed 50 times. Therefore, it has been confirmed that re-baking an optical element additionally improves adhesiveness between a birefringence layer and a base material.

Next, an example of an optical element having formed therein a coloring layer as a functional layer will be described.

Example 9

Preparation of Coloring Resist

A pigment-dispersed photoresist was used as a coloring material dispersion liquid for each of: a black matrix; and red (R), green (G), and blue (B) coloring pixels. The pigment-dispersed photoresist is obtained by: adding beads to a dispersion liquid composition (containing a pigment, a dispersant, and a solvent); dispersing the resultant by means of a dispersing device for 3 hours; and mixing the dispersion liquid from which the beads have been removed and a clear resist composition (containing a polymer, a monomer, an additive, an initiator, and a solvent). The obtained pigment-dispersed photoresist has a composition as shown below. A PAINT SHAKER (manufactured by ASADA TEKKO) was used as the dispersing device.

| (Photoresist for black matrix) | |
|---|---|
| Black pigment<br>(TM BLACK # 9550 manufactured by<br>Dainichiseika Color & Chemicals Mfg. Co., Ltd.) | 14.0 parts by weight |
| Dispersant<br>(Disperbyk 111 manufactured by BYK-Chemie) | 1.2 parts by weight |
| Polymer<br>(VR60 manufactured by SHOWA<br>HIGHPOLYMER CO., LTD.) | 2.8 parts by weight |
| Monomer<br>(SR399 manufactured by Sartomer Company,<br>Inc.) | 3.5 parts by weight |
| Additive<br>(L-20 manufactured by Soken Chemical &<br>Engineering Co. Ltd.) | 0.7 part by weight |
| Initiator<br>(2-benzyl-2-dimethylamino-1-(4-<br>morpholinophenyl)-butanone-1) | 1.6 parts by weight |
| Initiator<br>(4,4'-diethylaminobenzophenone) | 0.3 part by weight |
| Initiator<br>(2,4-diethylthioxanthone) | 0.1 part by weight |
| Solvent<br>(ethyleneglycol monobutylether) | 75.8 parts by weight |
| (Photoresist for red (R) coloring pixel) | |
| Red pigment<br>(C.I. PR254 (CROMOPHTAL DPP Red BP<br>manufactured by Ciba Specialty Chemicals)) | 4.8 parts by weight |
| Yellow pigment<br>(C.I. PY139 (Paliotol Yellow D1819<br>manufactured by BASF)) | 1.2 parts by weight |
| Dispersant<br>(Solsperse 24000 manufactured by Zeneka<br>Colours) | 3.0 parts by weight |
| Monomer<br>(SR399 manufactured by Sartomer Company,<br>Inc.) | 4.0 parts by weight |
| Polymer 1 | 5.0 parts by weight |
| Initiator<br>(IRGACURE 907 manufactured by Nihon<br>Ciba-Geigy K.K.) | 1.4 parts by weight |
| Initiator<br>(2,2'-bis(o-chlorophenyl)-4,5,4',5'-tetraphenyl-<br>1,2'-biimidazol) | 0.6 part by weight |
| Solvent<br>(propyleneglycol monomethylether acetate) | 80.0 parts by weight |
| (Photoresist for green (G) coloring pixel) | |
| Green pigment<br>(C.I. PG7 (Seika Fast Green 5316P manufactured<br>by Dainichiseika<br>Color & Chemicals Co., Ltd.)) | 3.7 parts by weight |
| Yellow pigment<br>(C.I. PY139 (Paliotol Yellow D1819<br>manufactured by BASF)) | 2.3 parts by weight |
| Dispersant<br>(Solsperse 24000 manufactured by Zeneka<br>Colours) | 3.0 parts by weight |
| Monomer<br>(SR399 manufactured by Sartomer Company,<br>Inc.) | 4.0 parts by weight |
| Polymer 1 | 5.0 parts by weight |
| Initiator<br>(IRGACURE 907 manufactured by Nihon<br>Ciba-Geigy K.K.) | 1.4 parts by weight |
| Initiator<br>(2,2'-bis(o-chlorophenyl)-4,5,4',5'-tetraphenyl-<br>1,2'-biimidazol) | 0.6 part by weight |
| Solvent<br>(propyleneglycol monomethylether acetate) | 80.0 parts by weight |

-continued

| (Photoresist for blue (B) coloring pixel) | |
|---|---|
| Blue pigment<br>(C.I. PB15: 6 (Heliogen Blue L6700F<br>manufactured by BASF)) | 4.6 parts by weight |
| Violet pigment<br>(C.I. PV23 (Hostaperm RL-NF manufactured by<br>Clariant)) | 1.4 parts by weight |
| pigment derivative<br>(Solsperse 12000 manufactured by Zeneka<br>Colours) | 0.6 part by weight |
| Dispersant<br>(Solsperse 24000 manufactured by Zeneka<br>Colours) | 2.4 parts by weight |
| Monomer<br>(SR399 manufactured by Sartomer Company,<br>Inc.) | 4.0 parts by weight |
| Polymer 1 | 5.0 parts by weight |
| Initiator<br>(IRGACURE 907 manufactured by Nihon<br>Ciba-Geigy K.K.) | 1.4 parts by weight |
| Initiator<br>(2,2'-bis(o-chlorophenyl)-4,5,4',5'-tetraphenyl-<br>1,2'-biimidazol) | 0.6 part by weight |
| Solvent | 80.0 parts by weight |

(Propyleneglycol Monomethylether Acetate)

It should be noted that the polymer 1 described herein is obtained by adding 16.9 mol % of 2-methacryloyloxy ethyl-isocyanate with respect to 100 mol % of a copolymer consisting of benzylmethacrylate:styrene:acrylic acid:2-hydroxyethyl methacrylate=15.6:37.0:30.5:16.9 (molar ratio), and has a weight average molecular weight of 42,500.

A black matrix was produced on a base material by means of a coloring material dispersion liquid as described below.

[Coating with Coloring Material Dispersion Liquid]

A melt-molded aluminosilicate thin-plate glass having a thickness of 0.7 mm (manufactured by Corning Incorporated, product number; 1737) was prepared. The surface of the glass was washed, and the resultant was provided as a substrate.

The substrate was coated with a photoresist for forming a black matrix by means of a spin coating method, whereby a coating film was produced.

[Baking and Patterning of Coating Film]

After the coating, the substrate having formed thereon the coating film was pre-baked (preliminarily baked) at a temperature of 90° C. for a heating time of 3 minutes. After the pre-baking, the resultant was exposed to ultraviolet light at a radiation dose of 100 mJ/cm$^2$ through a predetermined pattern. After the exposure, the resultant was subjected to spray development with a 0.05% aqueous solution of KOH for 60 seconds. After that, the resultant was post-baked (baked) at a temperature of 200° C. for a heating time of 30 minutes. As a result, a black matrix having an opening corresponding to a site where a pixel would be formed and a thickness of 1.2 μm was formed.

Next, a red pattern was produced on a base material as described below.

[Coating with Coating Material Dispersion Liquid]

The substrate having formed thereon the black matrix was coated with a photoresist for forming a red pattern by means of a spin coating method, whereby a coating film was produced.

[Baking and Patterning of Coating Film]

The base material having formed thereon the coating film was pre-baked at a temperature of 80° C. for a heating time of 5 minutes. After that, the resultant was subjected to alignment exposure through a predetermined pattern in such a manner that the radiation dose of an ultraviolet light source would be 300 mJ/cm². After the exposure, the resultant was subjected to spray development with a 0.1% aqueous solution of KOH for 60 seconds. After that, the resultant was subjected to post-baking as a baking step at a temperature of 200° C. for a heating time of 60 minutes. As a result, a red pattern having a thickness of 2.31 μm was formed at a position corresponding to a predetermined opening of the black matrix.

In addition, in the same manner as in the above step of forming a red pattern, a green pattern having a thickness of 2.62 μm was formed by means of a photoresist for forming a green pattern, and a blue pattern having a thickness of 2.90 μm was formed by means of a photoresist for forming a blue pattern in such a manner that the patterns for the respective colors of red, green, and blue would be arranged at positions corresponding to different openings of the black matrix. Thus, a coating film pattern in which the patterns for three colors (red, green, and blue) were arranged was formed.

[Light Diffusion Layer Removing Step]

In the coating film pattern thus obtained, the black matrix is laminated and formed on the surface of the base material. Furthermore, coloring pixel portions for respective colors are laminated and formed. In addition, the light diffusion layer forms a surface layer to cover the coloring pixel portions.

The base material having formed thereon the coating film pattern was subjected to plasma etching so that the light diffusion layer was removed. As a result, an optical element in which a coloring layer composed of the coloring pixel portions and the black matrix had been formed on the surface of the substrate was produced. The conditions for the plasma etching were identical to those of Example 1. Etching was performed up to a position with a depth of 1,000 Å from the surface of the surface layer toward the surface of the base material.

The haze of the optical element before the performance of the plasma etching and that after the performance of the plasma etching were measured. Haze measurement was performed in the same manner as in Example 1. As a result, the haze before the performance of the plasma etching was 3.36 while the haze after the performance of the plasma etching was 2.5.

What is claimed is:

1. A method of producing an optical element which includes a base material having light transmittance and a functional layer containing a functional substance and laminated on a surface of the base material and in which a state of light passing through the functional layer is changed in accordance with the functional substance, the method comprising:
   a coating step of coating the surface of the base material with a functional layer composition liquid containing the functional substance to form a coating film;
   a baking step of baking the base material having the coating film formed on its surface to form the functional layer in which a functional layer-covering layer is formed to cover the functional layer and a light diffusion layer for diffusing light that has passed through the functional layer is formed in a direction from a surface layer of the functional layer-covering layer toward an interface between the functional layer-covering layer and the functional layer; and
   a covering layer removing step of removing at least the light diffusion layer out of the functional layer-covering layer to be formed in the baking step.

2. A method of producing an optical element according to claim 1, further comprising a re-baking step of baking a portion obtained by excluding the light diffusion layer from a layer composed of the functional layer and the functional layer-covering layer after the covering layer removing step.

3. A method of producing an optical element according to claim 1, wherein the covering layer removing step is performed in such a manner that the functional layer is exposed to a surface.

4. A method of producing an optical element according to claim 2, wherein the covering layer removing step is performed in such a manner that the functional layer is exposed to a surface.

5. A method of producing an optical element according to claim 1, wherein:
   in the baking step, an interstitial layer having light diffusion property lower than that of the light diffusion layer is formed in the functional layer-covering layer, the interstitial layer being positioned between the light diffusion layer and the functional layer; and
   the covering layer removing step is performed in such a manner that the interstitial layer is exposed to the surface.

6. A method of producing an optical element according to claim 2, wherein:
   in the baking step, an interstitial layer having light diffusion property lower than that of the light diffusion layer is formed in the functional layer-covering layer, the interstitial layer being positioned between the light diffusion layer and the functional layer; and
   the covering layer removing step is performed in such a manner that the interstitial layer is exposed to the surface.

7. A method of producing an optical element which includes a base material having light transmittance and a birefringence layer capable of birefringence light and laminated on a surface of the base material, the method comprising:
   a coating step of coating the surface of the base material with a birefringence layer composition liquid containing liquid crystal having polymerizability and an additive containing an orienting agent for imparting orientation to a liquid crystal molecule to form a coating film;
   an orienting step of imparting orientation to each of liquid crystal molecules in the coating film;
   a crosslinking step of subjecting the liquid crystal molecules to a crosslinking polymerization reaction while maintaining the orientation of each of the liquid crystal molecules;
   a baking step of baking the base material having formed thereon the coating film containing the liquid crystal that has been subjected to crosslinking polymerization to form the birefringence layer in which a birefringence layer-covering layer is formed to cover the birefringence layer and a light diffusion layer for diffusing light that has passed through the birefringence layer is formed in a direction from a surface layer of the birefringence layer-covering layer toward an interface between the birefringence layer-covering layer and the birefringence layer; and
   a covering layer removing step of removing at least the light diffusion layer out of the birefringence layer-covering layer to be formed in the baking step.

8. A method of producing an optical element according to claim 7, further comprising a re-baking step of baking a portion obtained by excluding the light diffusion layer from a layer composed of the birefringence layer and the birefringence layer-covering layer after the covering layer removing step.

9. A method of producing an optical element according to claim 7, wherein:
 an optical element to be produced by means of the method has an alignment layer containing the orienting agent for imparting orientation to a liquid crystal molecule, the alignment layer being formed between the base material having light transmittance and the birefringence layer;
 an alignment layer forming step of coating the surface of the base material with an alignment layer composition liquid containing the orienting agent for imparting orientation to a liquid crystal molecule to form the alignment layer is performed before the coating step; and
 the coating step is performed in such a manner that the birefringence composition liquid is applied onto the alignment layer to form the coating film.

10. A method of producing an optical element according to claim 7, wherein the orienting agent is intended for homeotropically orienting a liquid crystal molecule.

11. A method of producing an optical element according to claim 7, wherein the crosslinking step is performed in an air atmosphere.

12. A method of producing an optical element according to claim 7, wherein the crosslinking step is performed in an inert gas atmosphere.

13. A method of producing an optical element according to claim 7, wherein the covering layer removing step is performed in such a manner that the birefringence layer is exposed to a surface.

14. A method of producing an optical element according to claim 8, wherein the covering layer removing step is performed in such a manner that the birefringence layer is exposed to a surface.

15. A method of producing an optical element according to claim 7, wherein:
 in the baking step, an interstitial layer having light diffusion property lower than that of the light diffusion layer is formed in the birefringence layer-covering layer, the interstitial layer being positioned between the light diffusion layer and the birefringence layer; and
 the covering layer removing step is performed in such a manner that the interstitial layer is exposed to the surface.

16. A method of producing an optical element according to claim 8, wherein:
 in the baking step, an interstitial layer having light diffusion property lower than that of the light diffusion layer is formed in the birefringence layer-covering layer, the interstitial layer being positioned between the light diffusion layer and the birefringence layer; and
 the covering layer removing step is performed in such a manner that the interstitial layer is exposed to the surface.

17. A method of producing an optical element according to claim 1, wherein the covering layer removing step is performed by means of spin coating using a solvent capable of dissolving the light diffusion layer.

18. A method of producing an optical element according to claim 7, wherein the covering layer removing step is performed by means of spin coating using a solvent capable of dissolving the light diffusion layer.

19. A method of producing an optical element according to claim 1, wherein the covering layer removing step is performed by means of spin coating using a binder solution which is prepared by dissolving, into a solvent, a binder constituting a structure that can be laminated and formed on a surface to be exposed as a result of removal of the light diffusion layer, and which is capable of dissolving the light diffusion layer.

20. A method of producing an optical element according to claim 7, wherein the covering layer removing step is performed by means of spin coating using a binder solution which is prepared by dissolving, into a solvent, a binder constituting a structure that can be laminated and formed on a surface to be exposed as a result of removal of the light diffusion layer, and which is capable of dissolving the light diffusion layer.

21. A method of producing an optical element according to claim 1, wherein the covering layer removing step is performed by means of plasma dry etching.

22. A method of producing an optical element according to claim 7, wherein the covering layer removing step is performed by means of plasma dry etching.

23. A method of producing an optical element according to claim 1, wherein the covering layer removing step is performed by using means for polishing the surface layer with a polishing agent.

24. A method of producing an optical element according to claim 7, wherein the covering layer removing step is performed by using means for polishing the surface layer with a polishing agent.

25. A method of producing an optical element according to claim 7, wherein the base material has a coloring layer.

26. A method of producing an optical element according to claim 7, wherein the base material has a different birefringence layer having birefringence property different from that of the birefringence layer.

27. A method of producing an optical element according to claim 1, wherein in the baking step, the baking is performed at a temperature of 200° C. to 250° C.

28. A method of producing an optical element according to claim 7, wherein in the baking step, the baking is performed at a temperature of 200° C. to 250° C.

29. A method of producing an optical element according to claim 2, wherein in the re-baking step, the baking is performed at a temperature of 200° C. to 250° C.

30. A method of producing an optical element according to claim 8, wherein in the re-baking step, the baking is performed at a temperature of 200° C. to 250° C.

31. A method of producing an optical element according to claim 7, wherein the additive exudes to the surface side of the birefringence layer, and the light diffusion layer is formed into a layer shape at the position of the surface layer of the birefringence layer-covering layer.

32. A method of producing an optical element according to claim 15, wherein the interstitial layer is an isotropic layer.

* * * * *

UNITED STATES PATENT AND TRADEMARK OFFICE
CERTIFICATE OF CORRECTION

PATENT NO. : 7,582,336 B2
APPLICATION NO. : 11/409322
DATED : September 1, 2009
INVENTOR(S) : Atsushi Suemasu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this

Fourteenth Day of September, 2010

David J. Kappos
*Director of the United States Patent and Trademark Office*